United States Patent
Hardy et al.

(10) Patent No.: US 12,463,532 B2
(45) Date of Patent: Nov. 4, 2025

(54) MULTI-STAGE DC-DC CONVERTER

(71) Applicant: The Regents of the University of California, Oakland, CA (US)

(72) Inventors: Casey Hardy, South Lake Tahoe, CA (US); Hanh-Phuc Le, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 408 days.

(21) Appl. No.: 18/306,684

(22) Filed: Apr. 25, 2023

(65) Prior Publication Data

US 2023/0353054 A1    Nov. 2, 2023

Related U.S. Application Data

(60) Provisional application No. 63/337,273, filed on May 2, 2022.

(51) Int. Cl.
  *H02M 3/07*    (2006.01)
  *H02M 1/00*    (2007.01)

(52) U.S. Cl.
  CPC .......... *H02M 3/07* (2013.01); *H02M 1/0025* (2021.05); *H02M 1/007* (2021.05); *H02M 1/0095* (2021.05)

(58) Field of Classification Search
  CPC .. H02M 1/0058; H02M 1/007; H02M 1/0095; H02M 3/07
  See application file for complete search history.

(56) References Cited

U.S. PATENT DOCUMENTS

| | | | |
|---|---|---|---|
| 10,027,223 B1* | 7/2018 | Zhang | H02M 3/07 |
| 10,374,511 B2 | 8/2019 | Salem et al. | |
| 2013/0229841 A1* | 9/2013 | Giuliano | H02M 1/0043 |
| | | | 363/60 |
| 2020/0212801 A1* | 7/2020 | Cavallini | H02M 3/158 |

OTHER PUBLICATIONS

Hardy, et al., "A Flying-Inductor Hybrid DC-DC Converter for 1-Cell and 2-Cell Smart-Cable Battery Chargers", IEEE Journal of Solid-State Circuits, 2019, vol. 54, No. 12, pp. 3292-3305.
(Continued)

*Primary Examiner* — Jue Zhang
(74) *Attorney, Agent, or Firm* — Greer, Burns & Crain, Ltd.; Steven P. Fallon

(57) ABSTRACT

A multi-stage DC-DC power converter includes a first switched-capacitor stage driven by an input voltage. A second switched-capacitor stage is coupled to the first switched-capacitor by an inductor coupling current source. A controller controls charging and discharging of a flying capacitor by the inductor coupling current source in each of the first and second switched-capacitor stages. The controller operates such that each of the flying capacitors of the first and second switched-capacitor stages is soft charged by the inductor coupling current source and a frequency of a switched voltage across the inductor coupling current source is maintained to be high enough to limit inductor current ripple to be negligible compared to its DC component and ensure average inductor current is effectively reduced by factor equal to a voltage conversion ratio of the second switched-capacitor stage.

16 Claims, 31 Drawing Sheets

(56) References Cited

OTHER PUBLICATIONS

Jiang, et al., "Switched Tank Converters", IEEE Transactions on Power Electronics, 2019, vol. 34, No. 6, pp. 5048-5062.
Pilawa-Podgurski, et al., "Merged Two-Stage Power Converter Architecture with SoftCharging Switched-Capacitor Energy Transfer", IEEE Power Electronics Specialists Conference, 2008, pp. 4008-4015.
Sanders, et al., "The Road to Fully Integrated DC-DC Conversion via the Switched-Capacitor Approach", IEEE Transactions on Power Electronics, 2013, vol. 28, No. 9, pp. 4146-4155.
Seeman, et al., "Analysis and Optimization of Switched-Capacitor DC-DC Converters", IEEE Transactions on Power Electronics, 2008, vol. 23, No. 2, pp. 841-851.
Seo, et al., "S-Hybrid Step-Down DC-DC Converter—Analysis of Operation and Design Considerations", IEEE Transactions on Industrial Electronics, 2019, vol. 67, No. 1, pp. 265-275.
Wei, et al., "A Direct 12V/24V-to-1V 3W 91.2%-Efficiency Tri-State DSD Power Converter with Online VCF Rebalancing and In-Situ Precharge Rate Regulation", IEEE International Solid-State Circuits Conference, Digest of Technical Papers, 2020, pp. 190-192.
Texas Instruments, "Buck-Boost NVDC Battery Charger for Notebook Application Design Using BQ25720", SLUAAG7, 2021, pp. 1-9.

* cited by examiner

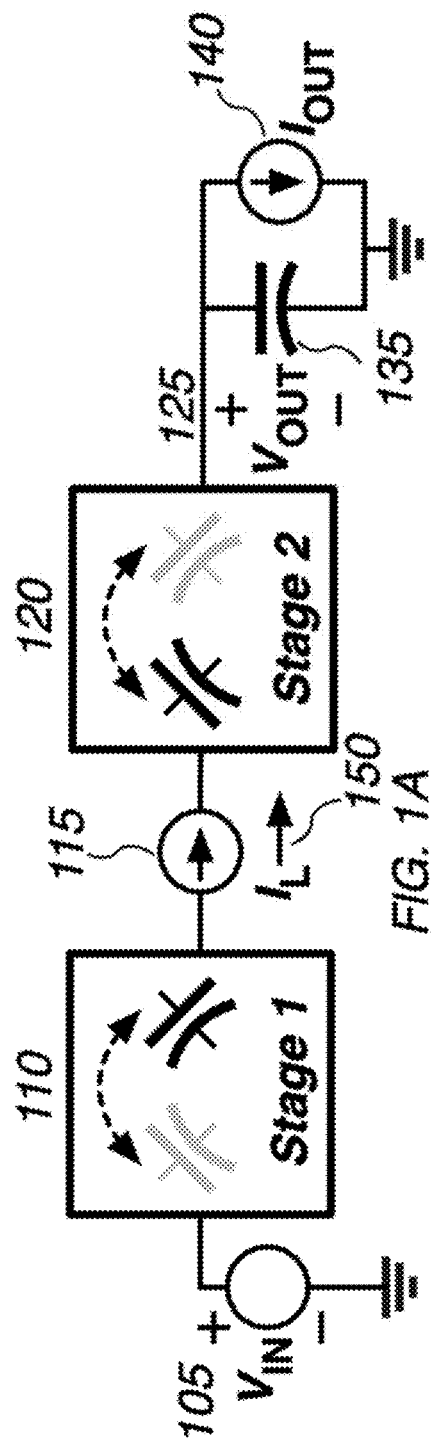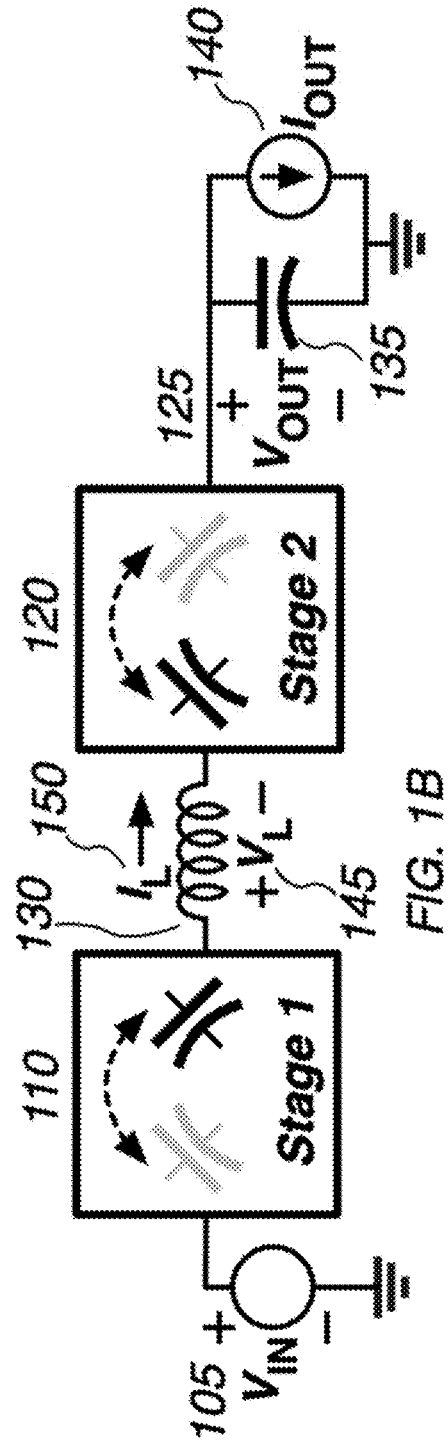

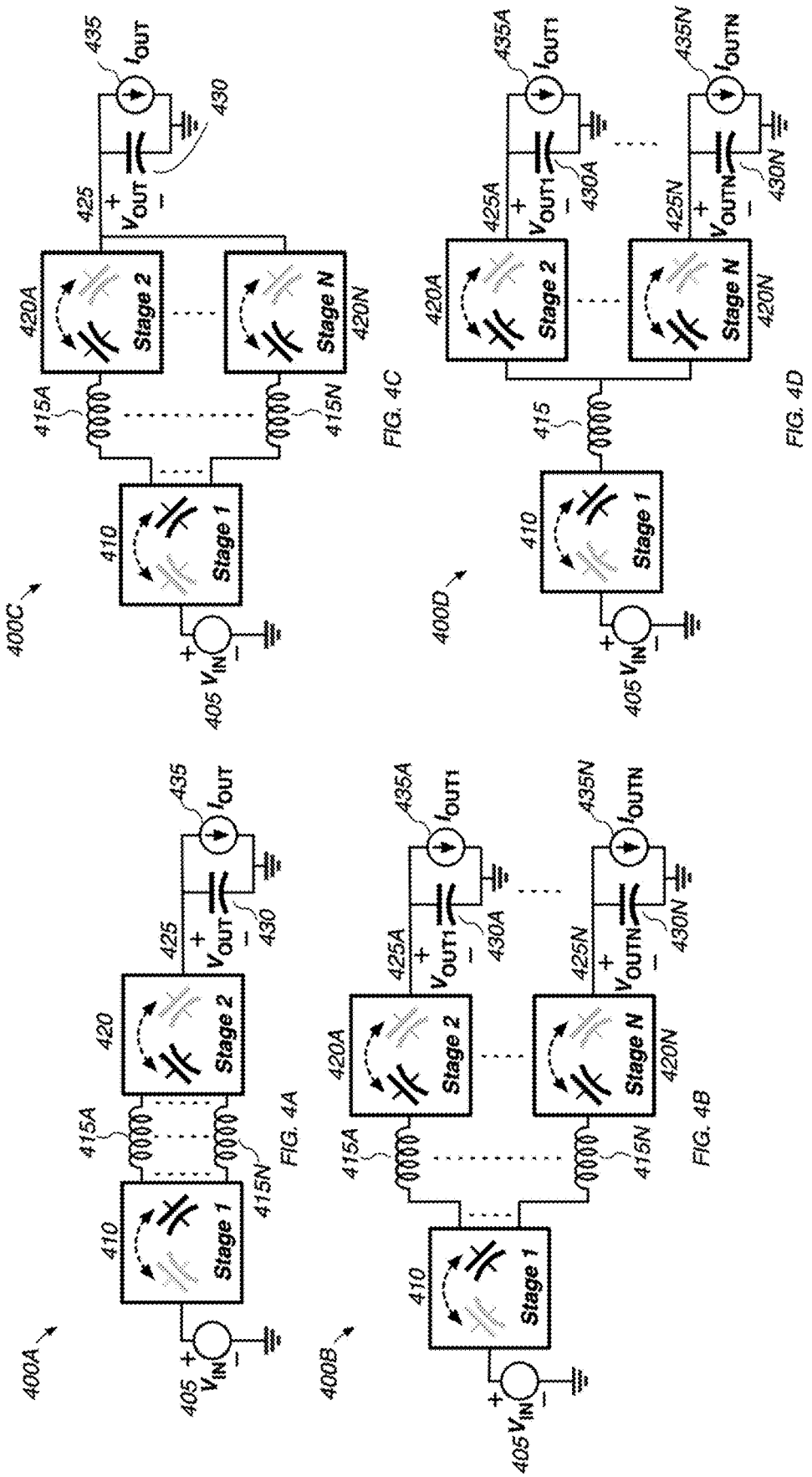

MULTI-STAGE DC-DC CONVERTER

PRIORITY CLAIM AND REFERENCE TO RELATED APPLICATION

The application claims priority under 35 U.S.C. § 119 and all applicable statutes and treaties from prior U.S. provisional application Ser. No. 63/337,273, which was filed May 2, 2022.

STATEMENT OF GOVERNMENT INTEREST

This invention was made with government support under 2043025 awarded by the National Science Foundation (NSF). The government has certain rights in the invention.

FIELD

The invention concerns DC-DC power converters. The invention has application, for example, to power electronics, power integrated circuits, switched-inductor circuits, switched-capacitor circuits, pulse width modulation circuits, and battery management systems.

BACKGROUND

DC-DC power converters have many applications that range from mobile electronics large scale data centers and to electric vehicles (EV). These and other example applications can have a large step-down requirement, for example from 48V to 1V. High voltage supply is used for efficiency of power delivery, while some modern high-performance electronics use a 1V supply. Such a large step-down is difficult to achieve while maintaining power delivery efficiency.

Large scale data centers benefit from large voltage step-down with high efficiency. Power delivery methods for large scale data centers continue to evolve to support the ever-growing big data demands of services such as cloud computing, machine learning, and streaming entertainment/social media services. As the power demand of data centers has continued to scale up year over year, modern power delivery systems have increased DC bus voltage to 48V from 12V to reduce the input current drawn by server racks. This higher voltage/lower current distribution scheme reduces the complexity of server system and board design while minimizing conduction losses associated with power delivery cables connecting the AC-DC converters to the point-of-load (PoL) converters in the server racks. However, the PoL converters must now provide a higher input-to-output voltage conversion ratio (VCR) to convert the 48V bus voltage to the 1V processor voltage domain. Multiple DC-DC converter stages are often used to realize this large VCR, but this comes at the cost of an energy conversion loss at each stage. Since the overall system power efficiency is determined by the product of the efficiencies of all the converter stages in the power delivery chain, it can be challenging to achieve the high VCR needed without diminishing the benefits of moving to the higher 48V bus.

Electric vehicles (EV) and advanced driver-assistance systems (ADAS) also make use of higher 48V bus voltages. 48V is now commonly used as the main power delivery bus voltage for various EV subsystems. A bus voltage of 48V permits use of smaller cables for power delivery, which reduces both cost and weight. Power conservation in EVs is of critical importance. Very high VCR with high efficiency is needed to step the 48V down to 1V for the ADAS processors while conserving power supplied by EV batteries.

Highly efficient and high VCR converters are also important for mobile electronics. Typical laptop battery packs and AC power adapters provide voltages as high as 20V that then need to be efficiently converted to the 1V processor supply domain in addition to other low voltage supply domains for other subsystems.

Battery charger solutions also require efficient DC-DC conversion. The application note, "Buck-Boost NVDC Battery Charger for Notebook Application Design Using BQ25720" by Texas Instruments, provides diagrams for a typical USB-C based power delivery system. The USB-C 3.1 power delivery (PD) specification was created to enable higher power delivery and faster charge times by providing a range of fixed bus voltages of 5V, 9V, 15V, 20V, 28V, 36V, and 48V or adjustable intermediate voltages depending on the capabilities of the USB-C power source and sink devices. The desired power converter solution would be capable of providing the high VCR needed for charging single cell lithium-ion batteries (typically 2.8V-4.3V) commonly found in smart phones and tablets while providing a wide enough VCR range to support charging from all possible bus voltage settings.

Conventional switching power converter solutions for achieving high VCRs are generally unsuitable for evolving applications. The most common example would be a conventional two-switch buck converter. A buck converter would need to operate at extremely low duty cycles and require semiconductor power switches with blocking voltage ratings greater than or equal to the input voltage when in the off state. This necessitates:

a. extremely short pulsed on-time durations for the input terminal connected high-side switch;
 b. the use of high voltage switches which consume substantially more circuit area and are significantly slower when compared low voltage rated counterparts.

For example, in a 48V input to 1V output scenario with a converter switching frequency of 1 MHz, the converter would require a duty cycle of ~2% which translates into 20 ns pulsed on-time and off-time durations for the high side and low side switches respectively. These short pulse durations can be impractically small, resulting in insufficient switch gate driver signaling to reliably turn on/off the power switches. This issue is exacerbated by the need for high voltage switches and their correspondingly slow switching speeds. Additionally, the need for high voltage rated switches typically results in significant switching losses. The sum of these drawbacks makes it challenging to reliably maintain high power efficiency in high VCR applications.

Another conventional approach is to cascade multiple power converters that operate independently from each other. The product of the converter VCRs then provides the overall VCR (i.e., first converter input voltage to last converter output voltage ratio) needed by the system. This lowers the required VCR for each converter and allows them to operate closer to their respective optimal operating points in terms of power efficiency. However, this approach also means the overall efficiency of the power delivery system is limited to the product of all the converter efficiencies. Therefore, to achieve high overall system efficiency, each converter in the cascade must maintain significantly high efficiency. For example, in an implementation with two cascaded converters the efficiency of each converter would need to be >95% to achieve an overall system efficiency>90%, assuming the power losses are equally balanced between each converter. Maintaining such high efficiencies for each converter can be challenging when utilizing conventional topologies such as the two-switch buck described above.

There are also numerous examples of transformer-based converter topologies that leverage the turns ratio of the transformers to facilitate increased VCRs. However, the magnetics of the transformer implementation can be physically large, heavy, and add substantial cost to the system. This is particularly a concern for applications that are sensitive to these drawbacks such as mobile products and EV.

Even if non-transformer-based converters are utilized, the inductors can still present a multitude of design challenges for conventional implementations. The inductors in conventional step-down converter topologies are typically located at the output of the converter and must conduct the full current provided to the load. Due to the high-power demands of applications such as high-performance processors and fast battery charging systems, the inductor must process significant levels of current. This typically requires the physical size of the inductor to be large or the inductor component count to be increased to minimize conduction losses associated with winding resistances, either of which increases board space and cost. Additionally, the saturation current rating of the inductor must be greater than the expected maximum current (DC load current plus ripple current peak) seen by the inductor. Increases in saturation current rating also typically translates into increases in physical size. The energy storage densities of inductors can be multiple orders of magnitude lower than capacitors. Sanders et al., "The Road to Fully Integrated DC-DC Conversion via the Switched-Capacitor Approach," IEEE Transactions on Power Electronics, Vol. 28 No. 9, pp 4264-55 (2012). This translates to inductors being one of the largest consumers of board space, and any increase in physical size can be challenging for space constrained products such as modern smart phones or tablets.

One approach to addressing these challenges is to eliminate the inductor completely by utilizing purely switched-capacitor converter (SCC) topologies. The high energy density of modern capacitor technology has allowed SCCs to become one potential avenue for promoting further system integration and area reduction. Unfortunately, when capacitors transfer charge through a purely resistive element (i.e. a power switch) there is an unavoidable charge transfer or redistribution loss that is proportional to the square of the voltage ripple across the capacitor during the charging and discharging events also known as hard charge losses. Seeman et al., "Analysis and Optimization of Switched-Capacitor DC-DC Converters, IEEE Transactions on Power Electronics, Vol. 23 No. 2, pp 841-45 (2008). SSC topologies can achieve high power efficiencies but only when operating near an optimal fixed VCR. Other VCRs can only be achieved by effectively increasing the voltage ripple across the capacitors. Therefore, voltage regulation beyond the ideal VCR for a given topology can only be achieved by incurring substantial energy losses and efficiency penalties.

Reconfigurable SCCs techniques can be leveraged to address this limitation by introducing the capability of changing the SCC topology or cascading and stacking of SC unit cells or combination of both. See, e.g., Salem et al., U.S. Pat. No. 10,374,511; Le et al., "Design Techniques for Fully Integrated Switched-Capacitor DC-DC Converters" IEEE Journal of Solid-State Circuits Vol. 46, No. 9, pp 2120-2131 (2011). These techniques come at the cost of additional power switches and control complexity. While feasible for low voltage applications where advanced technology nodes allow high switch count with manageable die area impact, it is less practical in applications where many switches interface with high voltage domains. High voltage rated switches are larger devices that introduce significant increases in gate and parasitic capacitances which result in practical limitations on maximum switching frequencies and associated switching losses.

Hybrid power conversion leverages both switched-inductor and switched-capacitor circuit techniques. One approach merges multiple stages together to achieve high VCRs at higher efficiencies compared to independent two stage implementations. An example approached combined the operation of a 3-to-1 series-parallel SCC and a synchronous buck converter to achieve an overall VCR equivalent to cascading these two stages while providing soft-charging benefits for the switched-capacitor stage to improve efficiency. Pilawa-Podgurski, et al., "Merged two-stage power converter architecture with soft charging switched-capacitor energy transfer," 2008 IEEE Power Electronics Specialists Conference, Rhodes, Greece, 2008, pp. 4008-4015, doi: 10.1109/PESC.2008.4592581. Another example combines the operation of a 3-level buck converter along with a series-capacitor buck converter to achieve higher VCR. Wei, et al., "11.1 A Direct 12V/24V-to-1V 3W 91.2%-Efficiency Tri-State DSD Power Converter with Online VCF Rebalancing and In-Situ Precharge Rate Regulation," 2020 IEEE International Solid-State Circuits Conference—(ISSCC), San Francisco, CA, USA, 2020, pp. 190-192, doi: 10.1109/ISSCC19947.2020.9063087. Both require an inductor in the high current output path and have only been demonstrated with limited input voltage ranges.

Resonant stages represent a different approach that seeks to address the large footprint of the inductors. Resonant SC stages have been utilized to dramatically reduce inductor size while providing both soft switching and soft charging benefits to maximize efficiency. Jiang, et al., "Switched Tank Converters," IEEE Transactions on Power Electronics, vol. 34, no. 6, pp. 5048-62 (2019). This topology is limited to fixed conversion ratios and does not provide a wide VCR range.

Another approach moves the inductor to the lower input current side of the converter while still achieving step-down conversion ratios. See, Seo and Le, "S-Hybrid Step-Down DC-DC Converter—Analysis of Operation and Design Considerations," IEEE Transactions on Industrial Electronics, vol. 67, no. 1, pp. 265-275 (January 2020); Hardy et al., "A Flying-Inductor Hybrid DC-DC Converter for 1-Cell and 2-Cell Smart-Cable Battery Chargers," IEEE Journal of Solid-State Circuits, vol. 54, no. 12, pp. 3292-3305, (2019). While significant inductor current reductions are provided proportional to the respective VCRs, they do not provide high enough VCRs for many applications.

SUMMARY OF THE INVENTION

A preferred embodiment provides a multi-stage DC-DC power converter includes a first switched-capacitor stage driven by an input voltage. A second switched-capacitor stage is coupled to the first switched-capacitor by an inductor coupling current source. A controller controls charging and discharging of a flying capacitor by the inductor coupling current source in each of the first and second switched-capacitor stages. The controller operates such that each of the flying capacitors of the first and second switched-capacitor stages is soft charged by the inductor coupling current source and a frequency of a switched voltage across the inductor coupling current source is maintained to be high enough to limit inductor current ripple to be negligible compared to its DC component and ensure average inductor current is effectively reduced by factor equal to a voltage conversion ratio of the second switched-capacitor stage.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 1A-1B illustrate a preferred two-stage power converter with an inductor coupling current source.

FIGS. 4A-4D illustrate preferred power converters utilizing one or multiple inductor coupling current sources and N number of stages to generate common or different output voltages.

DETAILED DESCRIPTION

Figure 2:
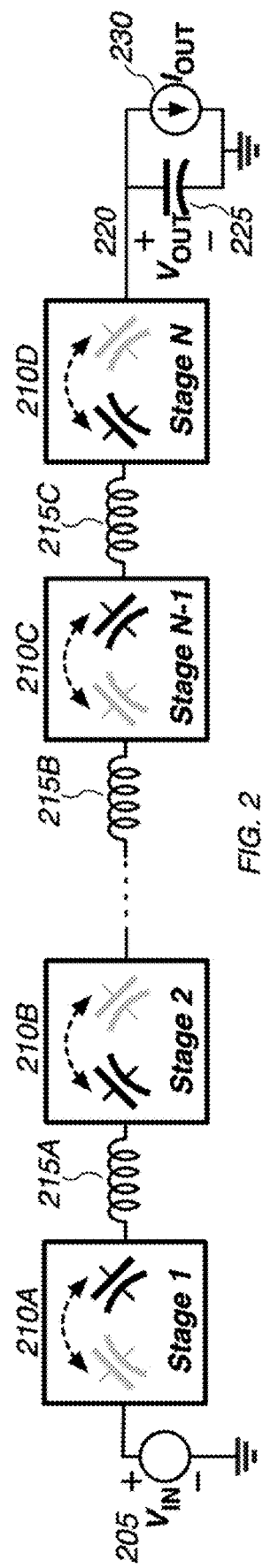
FIG. 2 illustrates a preferred power converter with N number of stages and N−1 inductor coupling current sources.

Methods and circuits of the invention merge the operation of plural SCC stages with an inductor coupling current source to achieve high input to output voltage conversion ratios (VCRs) of multiple cascaded, independently operated SCCs with the higher overall power efficiency of a cascade of SCCs of reduced number. An example converter provides the high VCR of two cascaded SCCs that operate independently, but yields the higher overall power efficiency of a single SCC.

Converters of the invention use one or more inductors as coupling current sources between stages. The inductor(s) therefore do not experience the high current of the output to load at the last stage of the converter. The inductor coupling current source in preferred converters can reduce or eliminate capacitive charge sharing or redistribution energy losses (i.e., hard charge losses) to increase power efficiency. Preferred converter control can minimize any residual hard charge losses that may be present in certain embodiments. Preferred embodiment methods and controllers provide detection and transition to optimal operating states are also disclosed.

DC-DC converters of the invention can be applied in many applications demanding high VCRs and high power efficiency including but not limited to DC-DC converters for data centers, electric vehicles, ADAS, and mobile products. Inductor coupling current sources can be implemented as a discrete electrical component or the parasitic inductance of a cable, printed circuit board trace, or other wire conductor. Preferred embodiments provide for reduction in magnetic component size, passive component count, and power switch count while extending VCR range and improving power efficiency over conventional prior art. From the end product perspective, this can translate into reductions in board space, component cost, operating cost, physical weight, and heat generation. Mobile products would also see the added benefit of extended battery life for the user.

While multiple example embodiments are disclosed, a plurality of SC topologies can be implemented in either stage to achieve unique VCRs and inductor current behavior. Each power stage may switch at equal or unequal frequencies in synchronous or asynchronous fashion.

The invention provides SC topologies that achieve unique VCRs and circuit operation. For certain embodiments, the ordering or sequencing of operating states for each SC stage can be defined as certain operating modes to achieve unique VCRs and circuit operation. The application of these modes can be applied statically or updated dynamically during normal operation for certain embodiments to achieve optimal operating conditions or desired circuit behavior. Mode transitions can be determined by external control (e.g., system software or firmware) or automated by internal circuitry of the converter implementation. The present converters can be extended to the parallelization of multiple versions of each SC stage and controlled such that paralleled stages are enabled and disabled depending on load power level requirements. Some embodiments can utilize a plurality of inductor coupling current sources to couple a SC stage to another SC stage. Some embodiments utilize a plurality of inductor coupling current sources to couple a SC stage to a plurality of SC stages with a common output voltage. Some embodiments utilize a plurality of inductor coupling current sources to couple a SC stage to a plurality of SC with differing output voltages.

Some embodiments utilize an inductor to couple a SC stage to a plurality of SC stages with differing output voltages. In some embodiments, the converter is configured to operate in reverse direction where the output terminal of the last SC stage is coupled to an input voltage source and the input terminal of the first SC stage is coupled to a target load of the converter.

One embodiment disclosed utilizes modified series-parallel SC topologies in the first and second stages that are coupled through a single inductor coupling current source. The first stage contains a flying capacitor and four power switches and interfaces with the input voltage source. The second stage contains another flying capacitor and three power switches and interfaces with the output terminal where the output voltage is generated to power the load. This embodiment allows 3 different voltage levels to be applied to one inductor terminal by the first stage and two different voltage levels to the other terminal by the second stage. Multiple operating modes are illustrated to achieve optimal operation for given conditions. Depending on the mode utilized, the first stage can actively switch between the different voltage levels to be applied to one side of the inductor coupling current source or statically apply the input voltage to the inductor terminal For operating modes where the first stage is actively switching, the first stage flying capacitor is completely soft charged and discharged by the inductor coupling current source current; eliminating any hard charge losses associated with this capacitor. For operating modes where the first stage statically applies the input voltage to the inductor terminal, the first stage flying capacitor is repurposed as an additional input bypass capacitor for the input voltage source. The second stage has two operating phases where its flying capacitor is charged by the inductor coupling current source in one phase and is discharged into the output capacitor and load in the other phase. Therefore, the inductor coupling current sources is also leveraged to provide partial soft charging benefits to the second stage to further reduce hard charge related conduction losses.

Preferred converters power efficient continuous output voltage regulation by varying the time durations that the inductor coupling current source is energized and de-energized through pulse width modulation (PWM) control. For operation modes where both stages are actively switching, the operating phase of the second stage can be reversed with respect to the first stage to actively reduce the residual hard charge losses associated with the second stage flying capacitor. In certain ones of available operating modes, this operating phase reversal of the second stage can be seamlessly automated to minimize second stage hard charge losses while maintaining the desired effective VCR of the converter. By placing the inductor coupling current source between the two stages, the DC inductor current is reduced by a factor proportional to the individual voltage conversion ratio of the second stage when compared to a traditional inductor-based step-down topology (e.g., a buck converter) where the inductor must conduct the full load current. A preferred embodiment converter provides 4 operating states with unique VCRs that encompass a wide input to output operating range. This converter is advantageous, for example, in USB-C 3.0 PD compliant battery charging systems where the input voltage can range from 5V to 20V (input voltage source for the converter) and battery voltage can vary from 2.8V to 4.3V (output voltage of the converter).

Another preferred embodiment implements the first stage with a star Dickson SC topology to increase the effective VCR even further. The first stage consists of 3 flying capacitors and 8 power switches that cycle through 3 operating states resulting in two voltage levels to applied to one side of the inductor. The second stage provides two levels of voltage swing to the other inductor terminal. The inductor coupling current source current is again utilized to softly charge and discharge the flying capacitors in the first stage. With correct flying capacitor values selected, all hard charge losses related to the flying capacitors can be eliminated in the first stage. Guidance for selecting flying capacitor values is provided by R. Das, G.-S. Seo and H.-P. Le, "A 120V-to-1.8V 91.5%-Efficient 36-W Dual-Inductor Hybrid Converter with Natural Soft-charging Operations for Direct Extreme Conversion Ratios," 2018 IEEE Energy Conversion Congress and Exposition (ECCE), Portland, OR, USA, 2018, pp. 1266-1271, doi: 10.1109/ECCE.2018.8557854. The inductor coupling current source current provides soft charging benefits to the second stage flying capacitor and the operating phases with respect to the first stage can be reversed to actively manage residual hard charge losses of the second stage flying capacitor. This embodiment results in a factor of 2 increase in the maximum realizable VCR compared to the embodiment in the previous paragraph. This level of VCR is especially advantageous, for example, to 48V based data center and automotive PoL converter applications.

Preferred embodiments of the invention will now be discussed with respect to the drawings and experiments used to demonstrate the invention. The drawings may include schematic representations, which will be understood by artisans in view of the general knowledge in the art and the description that follows.

FIGS. 1A-1B illustrate a preferred two-stage DC-DC power converter with an inductor coupling current source 130 that merges operation of multiple switched-capacitor (SC) stages. A first stage 110 is connected to an input voltage source 105 and the second stage 120 is connected to the output voltage node 125, output capacitor 135, and target load 140. FIG. 1A shows an ideal current source 115 is placed between two SC stages 110 and 120 which enables the capacitors in each stage to be soft charged by the current source 115. FIG. 1B shows that the current source 115 is realized with an inductor coupling current source 130. A frequency of the switched voltage 145 across the inductor coupling current source 130 is high enough to ensure the AC component of the inductor current 150 is negligible with respect to its DC component. General guidance for DC-DC converters operating with a small ripple approximation limits peak-to-peak ripple current to <30-40% of its maximum DC value. Besides enabling soft-charging benefits, the placement of the inductor coupling current source 130 between the SC stages 110 and 120 ensures it is not subject to high output current levels. The average inductor current 150 is effectively reduced by factor equal to VCR of the second stage 120 in FIG. 1B compared to the inductor at the output of a conventional buck converter. This results in reduced inductor power losses and reduced inductor saturation current rating requirements.

While fundamental examples in FIGS. 1A-1B only show two SC stages 110 and 120, the disclosed invention can be extended to N number of cascaded stages 210A-210D with N-1 number of inductor coupling current sources 215A-215C as shown in FIG. 2. The N stages 210A-210D convert an input voltage 205 to lower output voltage 220 across an output capacitor 225 with a higher current 230.

Figure 3A:
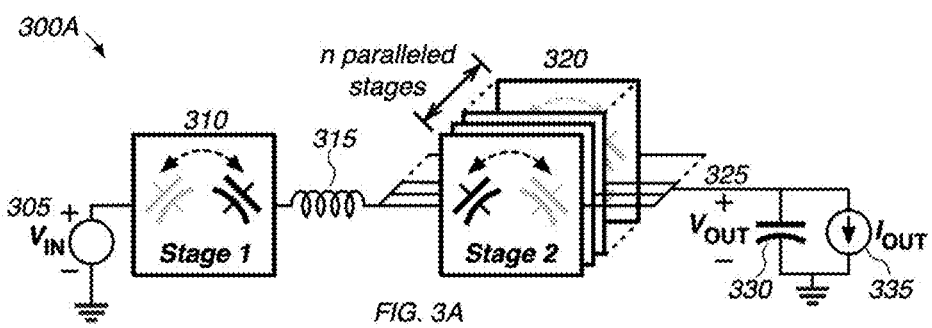
FIGS. 3A-3C illustrate preferred power converters with m and n number of paralleled stages each utilizing a single inductor coupling current source.
Figure 3B:
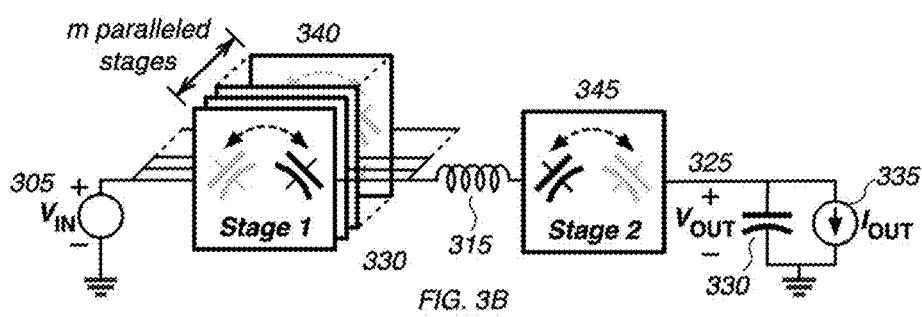
Figure 3C:
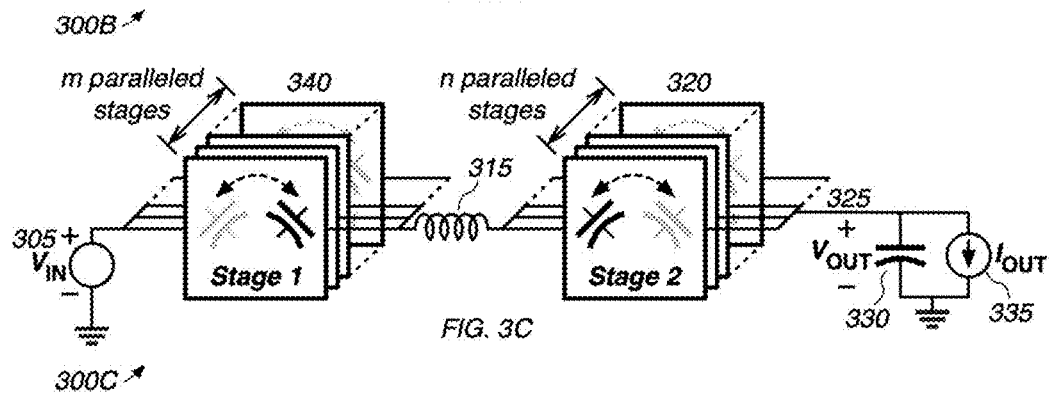

FIGS. 3A-3C illustrate preferred power converters 300A-300C with m and n number of paralleled stages each utilizing a single inductor coupling current source. The parallelization of multiple scaled versions of each SC stage 320 and 340 is different in each of the power converters 300A-300C. Paralleled stages can be enabled and disabled based on power level requirements, allowing power efficiency optimization across a wide range of load levels. The first converter 300A includes a first stage 310 and n paralleled second stages 320. The second converter 300B includes m paralleled first stages 340 and a second stage 345. The third converter 300C includes m paralleled first stages 340 and n paralleled second stages 320. Each of the converters 300A, 300B and 300C steps down an input voltage 305 to lower output voltages 325 across output capacitors 330 at output current 335, and each includes an inductor coupling current source 315 that couples the stages and serves as a current source for the second stage.

FIGS. 4A-4D illustrate preferred power converters 400A-400D utilizing one or more inductor coupling current sources 415A-415N and N number of stages to generate common or different output voltages. The converter 400A includes inductor coupling current sources 415A-415N between a first SC stage 410 and a second SC stage 420. An input voltage 405 is stepped down to an output voltage 430 with a current 435 at an output terminal 425. The converter 400B includes inductor coupling current sources 415A-415N to couple a SC stage 410 to a plurality of parallel SC stages 420A-420N with differing output voltages 430A-430N and currents 435A-435N at output terminals 425A-435N. The converter 400C uses inductor current coupling current sources 415A-415N to couple a SC stage 410 to a plurality of SC stages 420A-420N with a common output voltage 425 across output capacitors 430 at currents 435. The converter 400D utilize an inductor coupling current source 415 to couple a SC stage 410 to a plurality of SC stages 420A-420N with differing output voltages 425A-425N across capacitors 430A-430N at currents 435A-435N.

Figure 5:
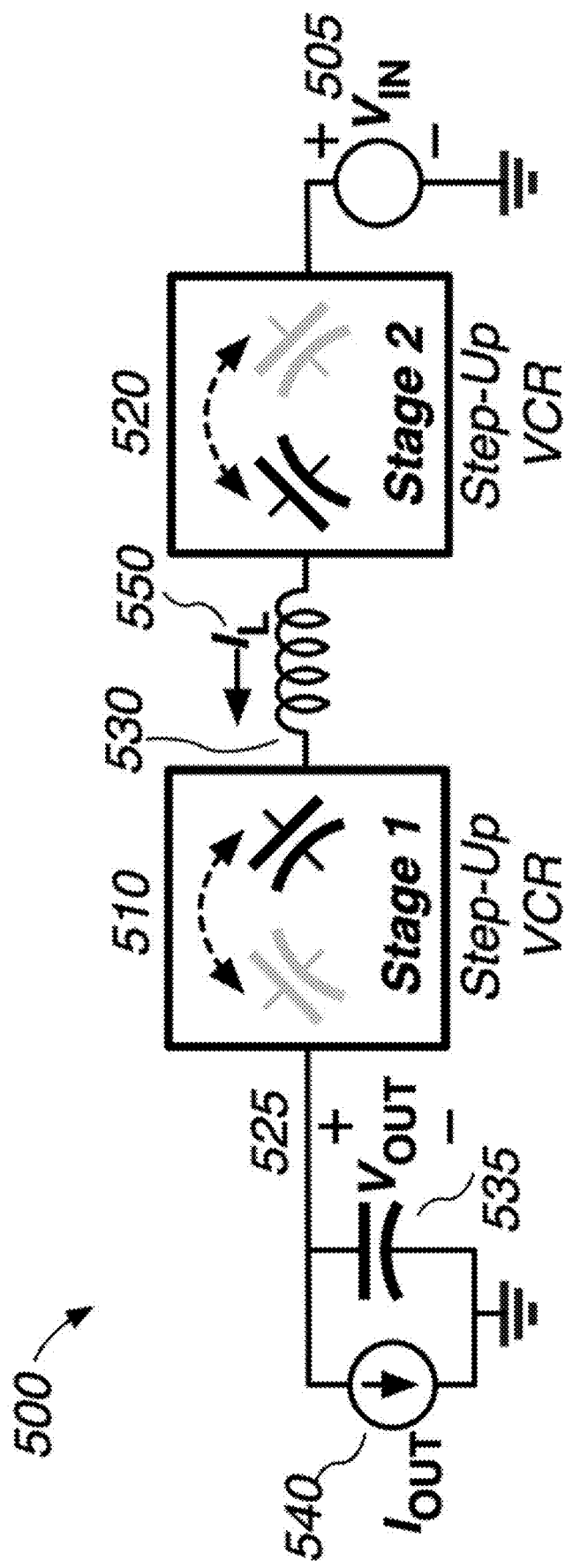
FIG. 5 shows a preferred two-stage power converter implementation where power flow is reversed to achieve a step-up voltage conversion ratio in accordance with the invention.

FIG. 5 shows a preferred two-stage power converter 500 where power flow is reversed to achieve a step-up voltage conversion ratio. A last SC stage 520 is coupled to an input voltage source 505 and the first SC stage 510 is coupled to a target load 540 of the converter 500 across capacitor 535 at current 540. The stages 520 and 510 are coupled by an inductor current coupling current source 530 that has a small current 530. In the converter 500, the input voltage 505 value is less than the output voltage 525 value.

Figure 6:
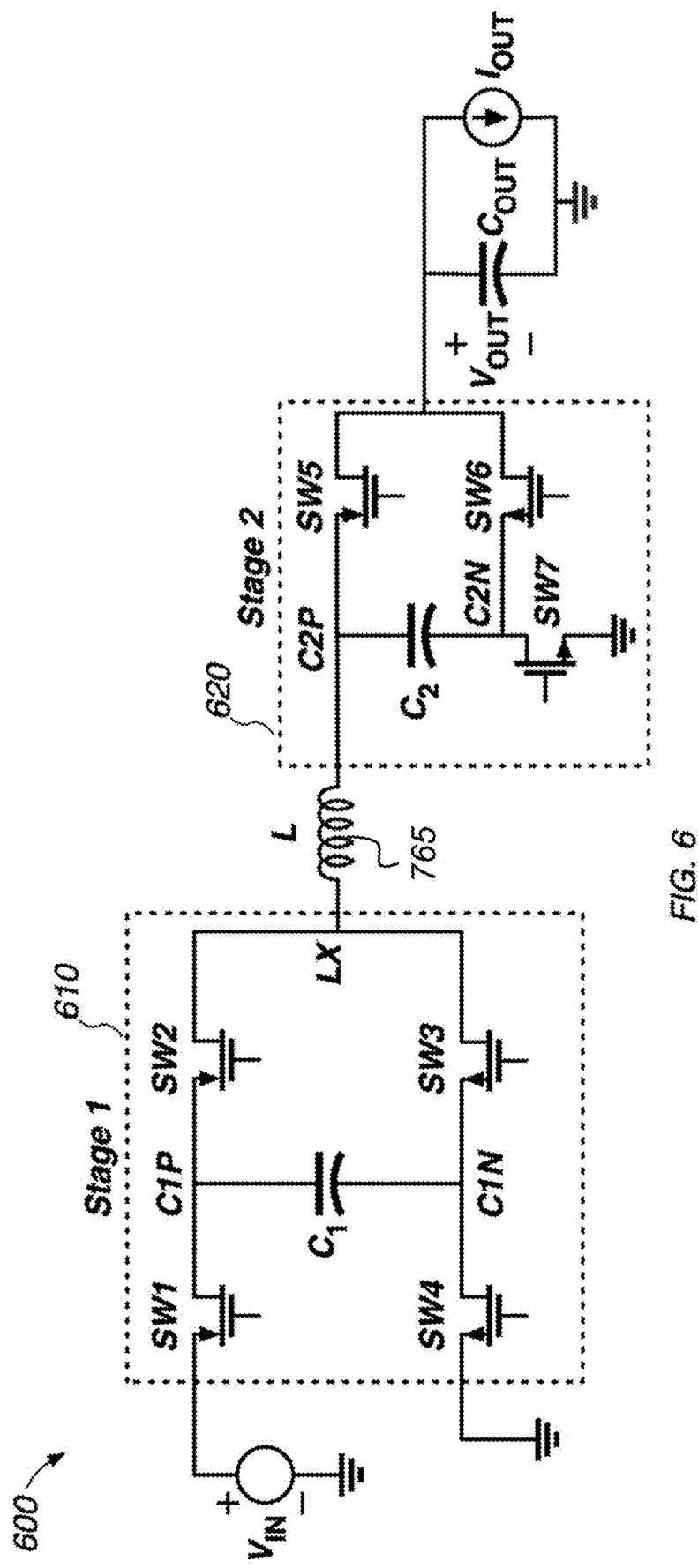
FIG. 6 shows a circuit diagram of a preferred power converter utilizing a single inductor coupling current source and two series-parallel switched-capacitor stages.

FIG. 6 is a circuit diagram of a preferred power converter 600 utilizing a single inductor coupling current source 615 and two series-parallel switched-capacitor stages 610 and 620. The first and second stages 610 and 620 are both series-parallel SC topologies. The example stages 610 and 620 use both PMOS and NMOS MOSFET power switches, but the power switch type (e.g., MOSFET vs. GaN FET) and complementary device type (e.g., NMOS vs. PMOS) is a matter of design choice. The converter 600 implements four different operating modes which provide four unique VCRs. These four modes are referred to as lower-level series-parallel (LSP), lower-level parallel-series (LPS), upper-level parallel-series (UPS), and bypass parallel-series (BPS). For each of the four modes, the duty cycle (D) times half of the switching period ($T_{SW}/2$) is defined as time spent energizing current in the inductor coupling current source 765.

Figure 7A:
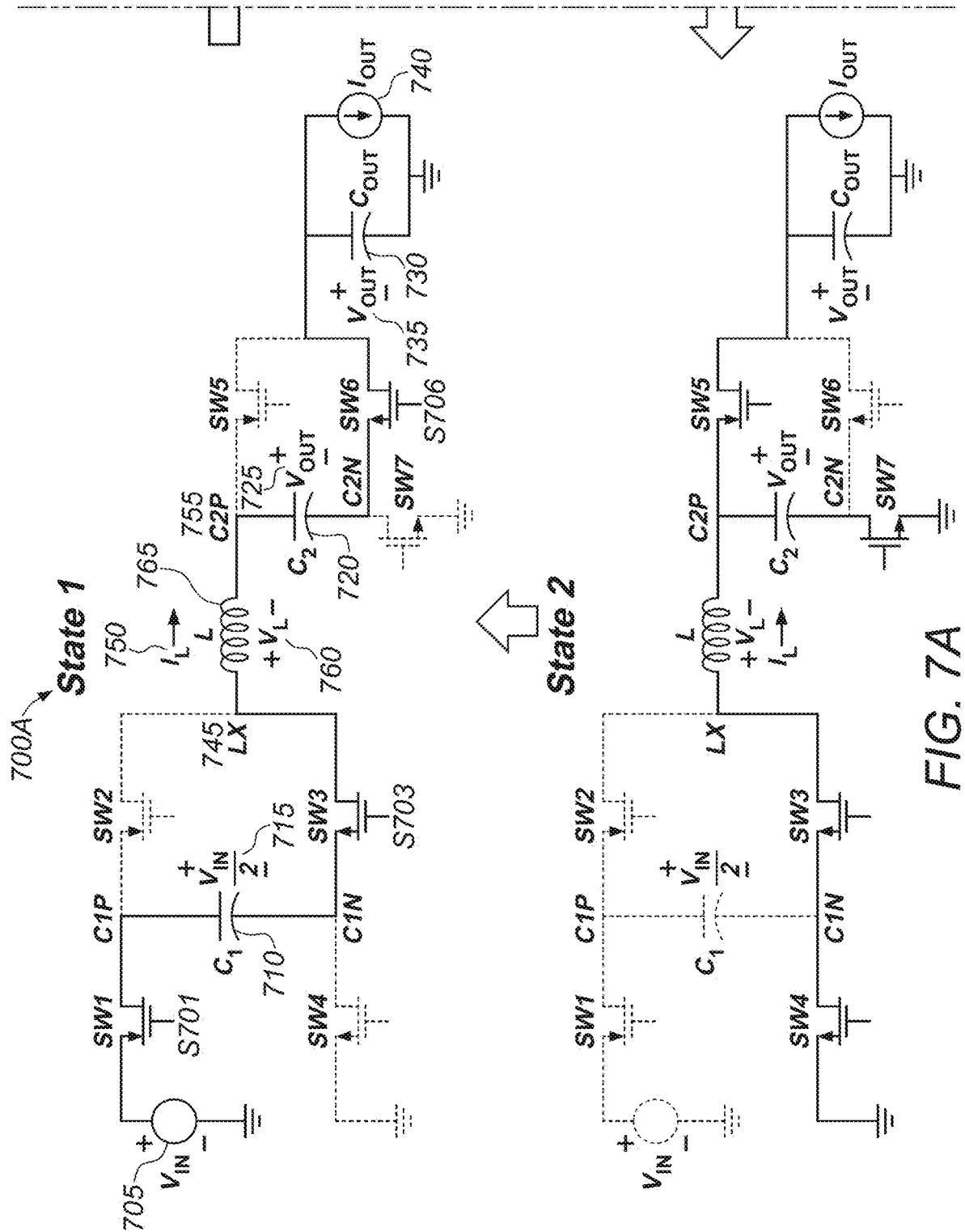
FIGS. 7A and 7B show operating states of a preferred power converter utilizing a single inductor coupling current source and two series-parallel switched-capacitor stages operating in lower-level series-parallel mode.
Figure 7B:
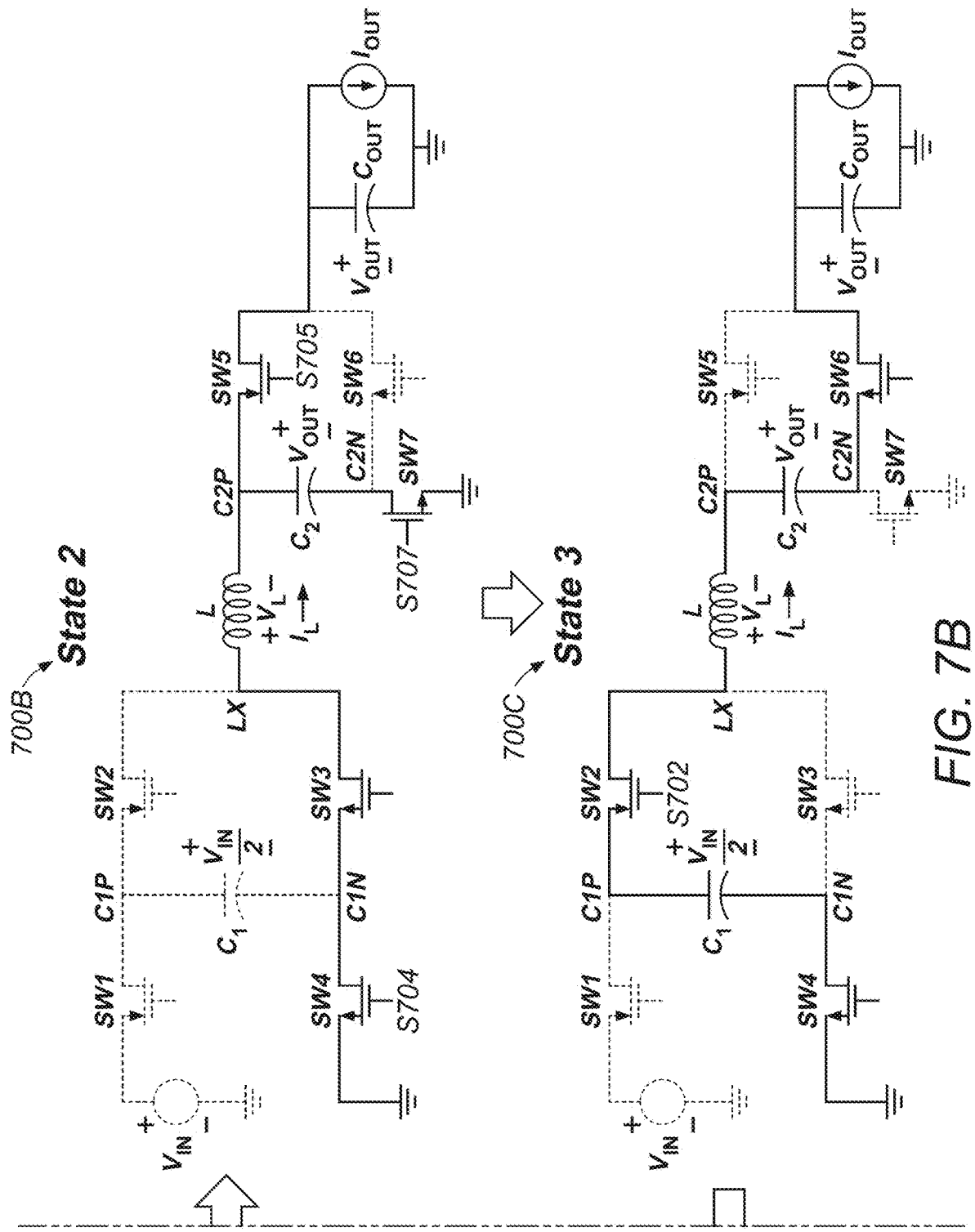
Figure 8:
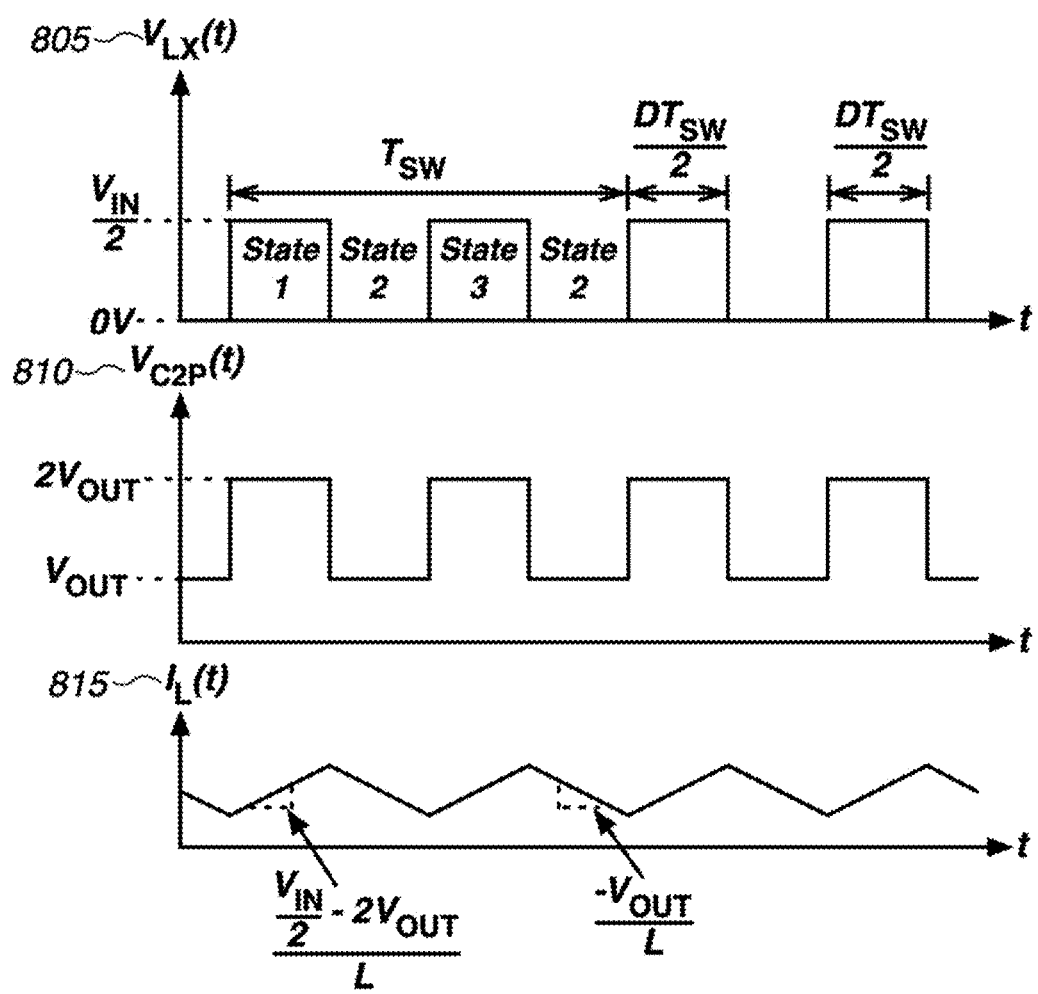
FIG. 8 shows operating waveforms of preferred a power converter utilizing a single inductor coupling current source and two series-parallel switched-capacitor stages operating in lower-level series-parallel mode.

FIGS. 7A-7B show the operating states of the converter 600 while operating in the LSP mode and FIG. 8 shows corresponding waveforms. In steady-state operation, the average voltages 715 and 725 across the flying capacitors C1 710 and C2 720 are $V_{IN}/2$ and $V_{OUT}$ respectively. The mode consists of the three operating states shown in FIG. 7. In state 1 700A, switches SW1 S701, SW3 S703, and SW6 S706 are on, resulting in the voltage at the LX node 805 to be equal to $V_{IN}/2$ and the voltage at the C2P node 810 to be equal to $2V_{OUT}$. This results in the voltage 760 across the inductor coupling current source 765 to be $$V_{IN}/2 - 2V_{OUT}.$$

Since $2V_{OUT} < V_{IN}/2$, inductor current 815 starts ramping up at a rate of $$\frac{(V_{IN}/2 - 2V_{OUT})}{L}$$

where L is the inductance of the inducting coupling current source 765. During this time, both C1 710 and C2 720 are soft charged by the inductor current 750. In state 2 700B, switches SW3 S703, SW4 S704, SW5 S705, and SW7 S707 are on resulting in a LX node voltage 805 equal to 0V and a C2P node voltage 810 of $V_{OUT}$. The inductor voltage 760 is then $$-V_{OUT}$$

and the inductor current 815 starts ramping down at a rate of $$-V_{OUT}/L.$$

At this point, the voltage across capacitor C1 710 remains static while C2 720 is connected in parallel with $C_{OUT}$ 730 and the target load 740 and discharges its accumulated charge from the previous state. In state 3 700C, switches SW2 S702, SW4 S704, and SW6 S706 are on resulting in the voltage at the LX node 805 to be equal to $V_{IN}/2$ and the voltage at the C2P node 810 to be equal to $2V_{OUT}$. The inductor current 815 ramps up again at a rate equal to the rate of state 1. During this time C1 710 is softly discharged by the inductor current 750 while C2 720 is softly charged by the inductor current 750. State 2 700B then occurs again and the state sequence is repeated. Artisans will appreciate that each stage does not need to operate at same switching frequency, as the second SC stage 620 in the converter 600 operates at twice the frequency of the first SC stage 610.

Performing steady-state inductor volt-sec balance analysis, it can be readily shown the VCR for the LSP mode is $$M_{V\_LSP} = \frac{D}{2(1+D)}.$$

Analyzing the steady-state charge flow for the inductor coupling current source 765 and flying capacitors 710 and 720, it can also be shown that $$M_{I\_LSP} = \frac{I_L}{I_{OUT}} = \frac{1}{1+D}$$

where $I_L$ 750 is the average inductor current and $I_{OUT}$ 740 is the average current flowing out of the $V_{OUT}$ node. From the inductor current ramp rate expressions, it can also be shown that the peak-to-peak inductor current ripple is $$\Delta i_{L\_LSP} = \frac{V_{IN}}{2Lf_{SW}} \frac{M_{V\_LSP} - 4(M_{V\_LSP})^2}{1 - 2M_{V\_LSP}}.$$

Figure 9A:
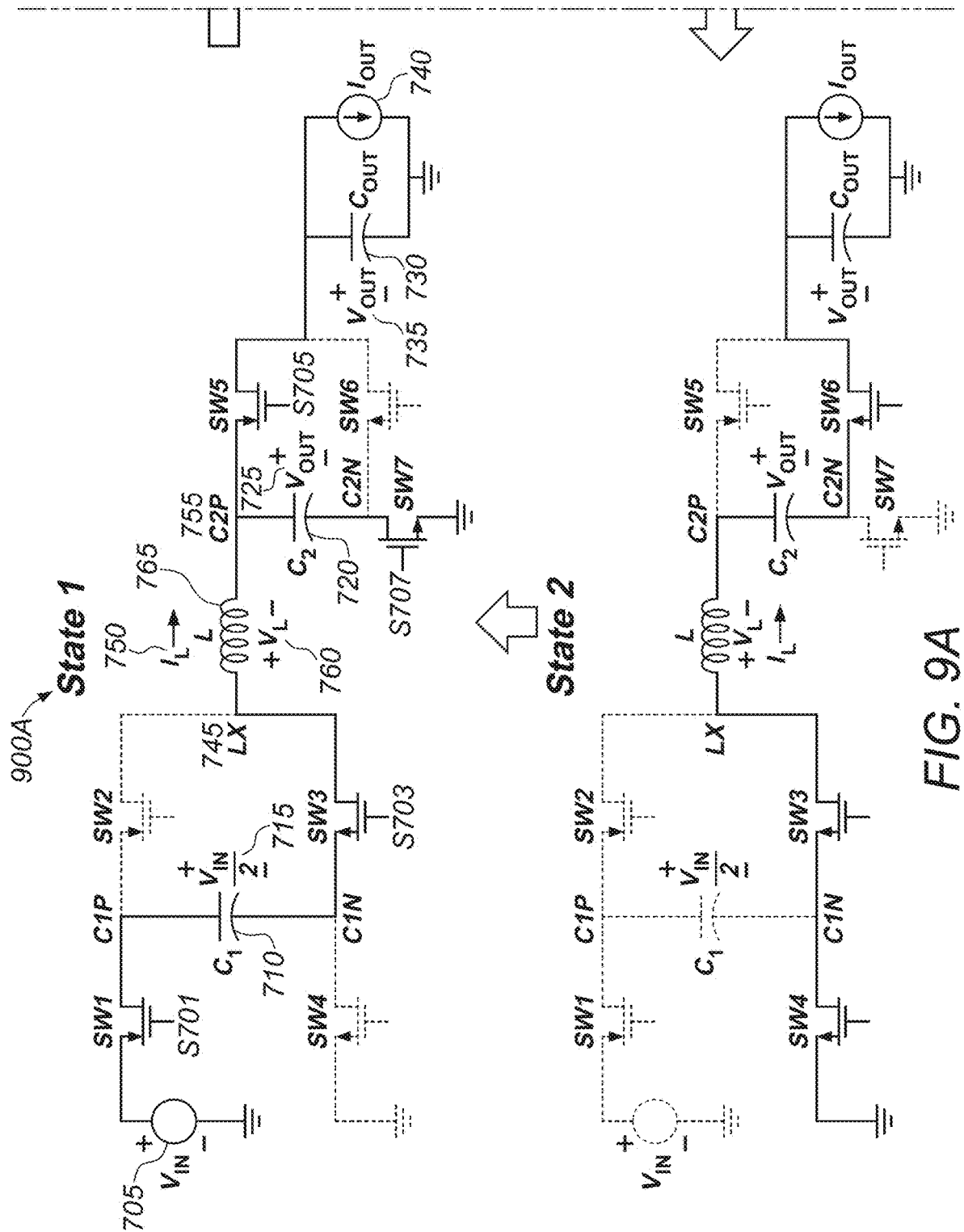
FIGS. 9A and 9B show the operating states of a preferred power converter utilizing a single inductor coupling current source and two series-parallel switched-capacitor stages operating in lower-level parallel-series mode.
Figure 9B:
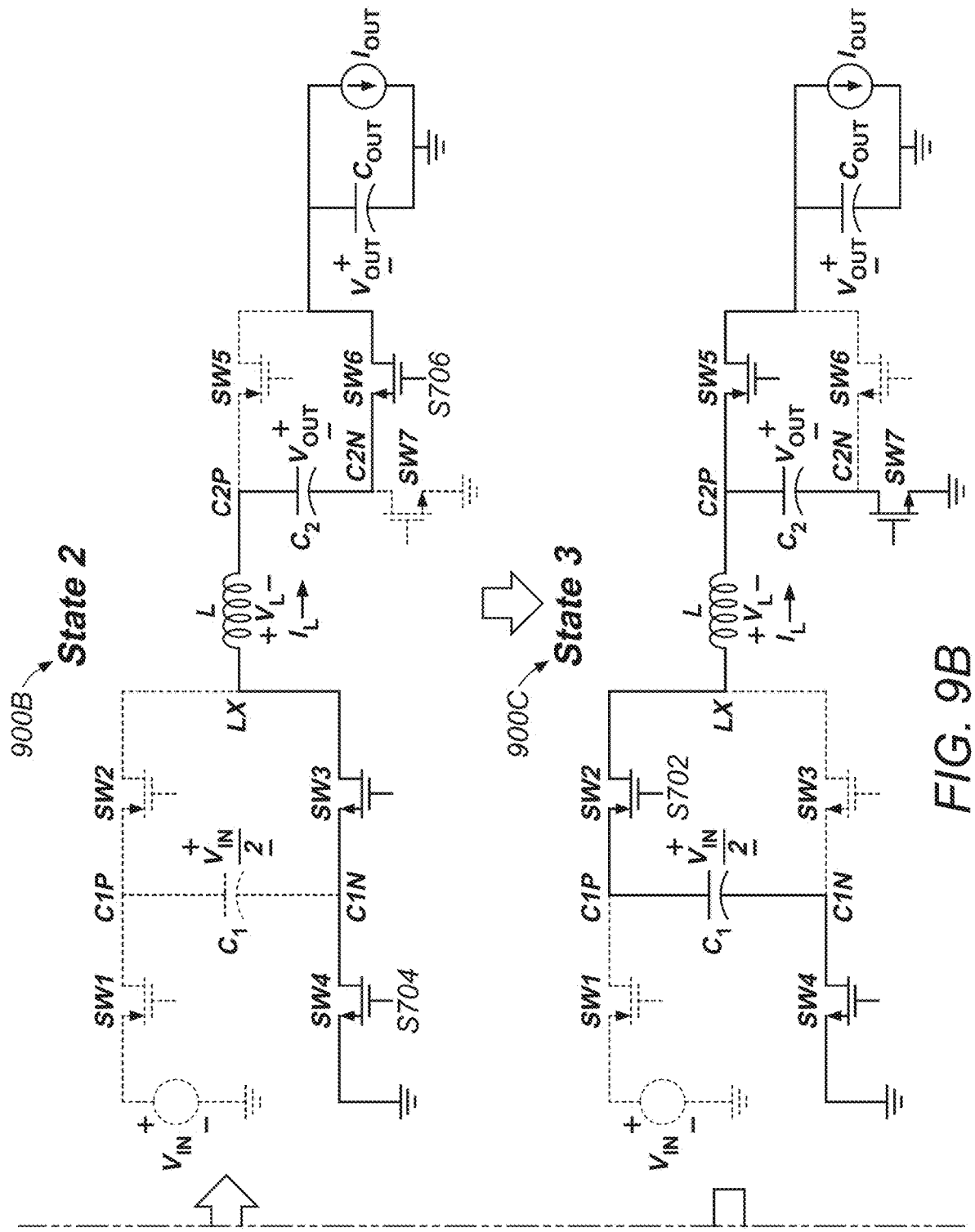
Figure 10:
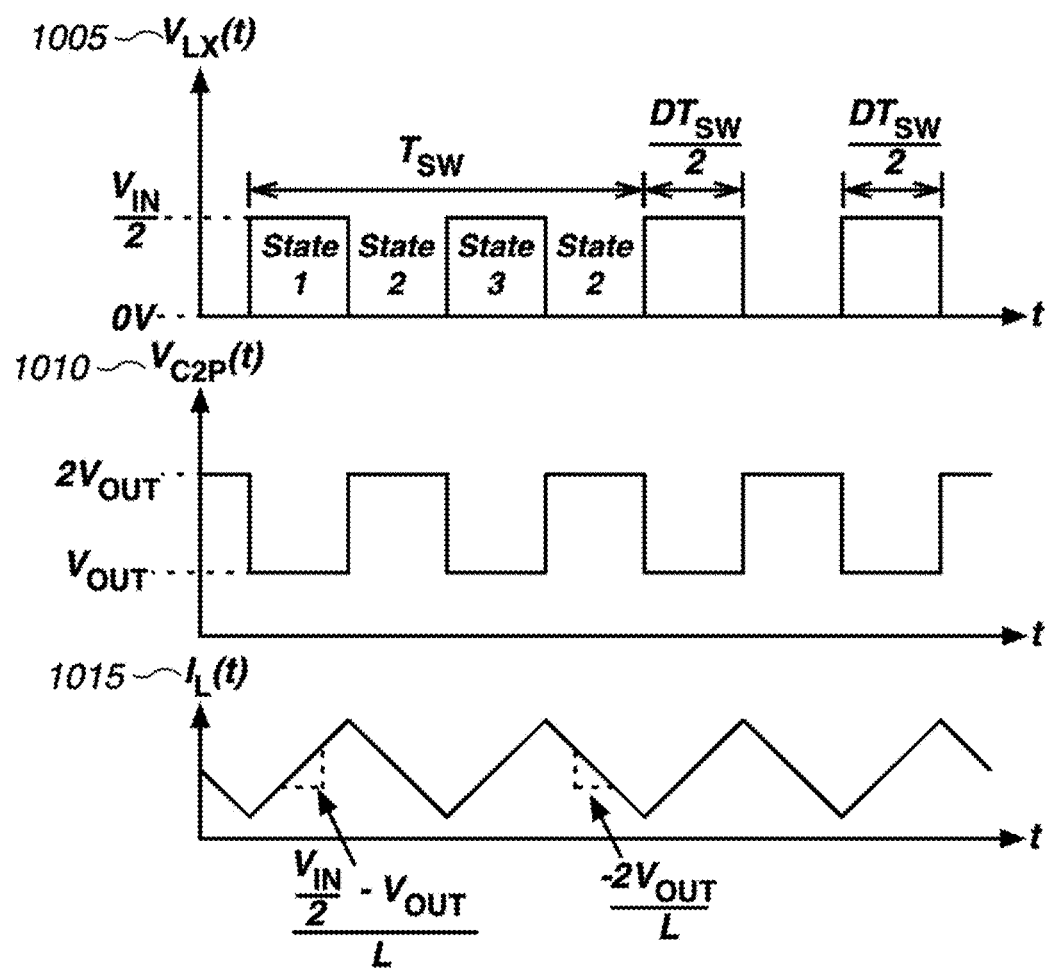
FIG. 10 shows operating waveforms of a preferred power converter utilizing a single inductor coupling current source and two series-parallel switched-capacitor stages operating in lower-level parallel-series mode.

FIGS. 9A-9B show the operating states of the converter 600 while operating in LPS mode and FIG. 10 shows corresponding waveforms. In steady-state operation, the average voltages across the flying capacitors C1 710 and C2 720 are $V_{IN}/2$ and $V_{OUT}$ respectively. The LPS mode consists of the three operating states shown in FIGS. 9A and 9B. In state 1 900A, switches SW1 S701, SW3 S703, SW5 S705, and SW7 S707 are on resulting in the voltage at the LX node 1005 to be equal to $V_{IN}/2$ and the voltage at the C2P node 1010 to be equal to $V_{OUT}$. This results in the voltage across the inductor being $$V_{IN}/2 - V_{OUT}$$

resulting in an inductor current 1015 ramp up rate of $$\frac{(V_{IN}/2 - V_{OUT})}{L}.$$

During this time, C1 710 is soft charged by the inductor current and C2 720 discharges into the output node. In state 2 900B, switches SW3 S703, SW4 S704, and SW6 S706 are on resulting in a LX node voltage 1005 equal to 0V and a C2P node voltage 1010 of $2V_{OUT}$. The inductor voltage is then $$-2V_{OUT}$$

and the inductor current 1015 ramps down at a rate of $$-2V_{OUT}/L.$$

At this point, the voltage across capacitor C1 710 remains static while C2 720 is soft charged by the inductor current 750. In state 3 900C, switches SW2 S702, SW4 S704, SW5 S705, and SW7 S707 are on resulting in the voltage at the LX node 1005 to be equal to $V_{IN}/2$ and the voltage at the C2P node 1010 to be equal to $V_{OUT}$. The inductor current 1015 ramps up again at a rate equal to the rate of state 1 900A. During this time C1 710 is softly discharged by the inductor current 750 while C2 720 is discharged into the output node. State 2 900B then occurs again and the state sequence is repeated.

Performing inductor volt-sec balance analysis, the resulting VCR for the LPS mode is $$M_{V\_LPS} = \frac{D}{2(2-D)}.$$

Analyzing the steady-state charge flow for the inductor 765 and flying capacitors 710 and 720, it can also be shown that $$M_{I\_LPS} = \frac{I_L}{I_{OUT}} = \frac{1}{2-D}.$$

From the inductor current ramp rate expressions, it can also be shown that the peak-to-peak inductor current ripple is $$\Delta i_{L\_LPS} = \frac{V_{IN}}{2Lf_{SW}} \frac{2M_{V\_LPS} - 4(M_{V\_LPS})^2}{1 + 2M_{V\_LPS}}.$$

Figure 11A:
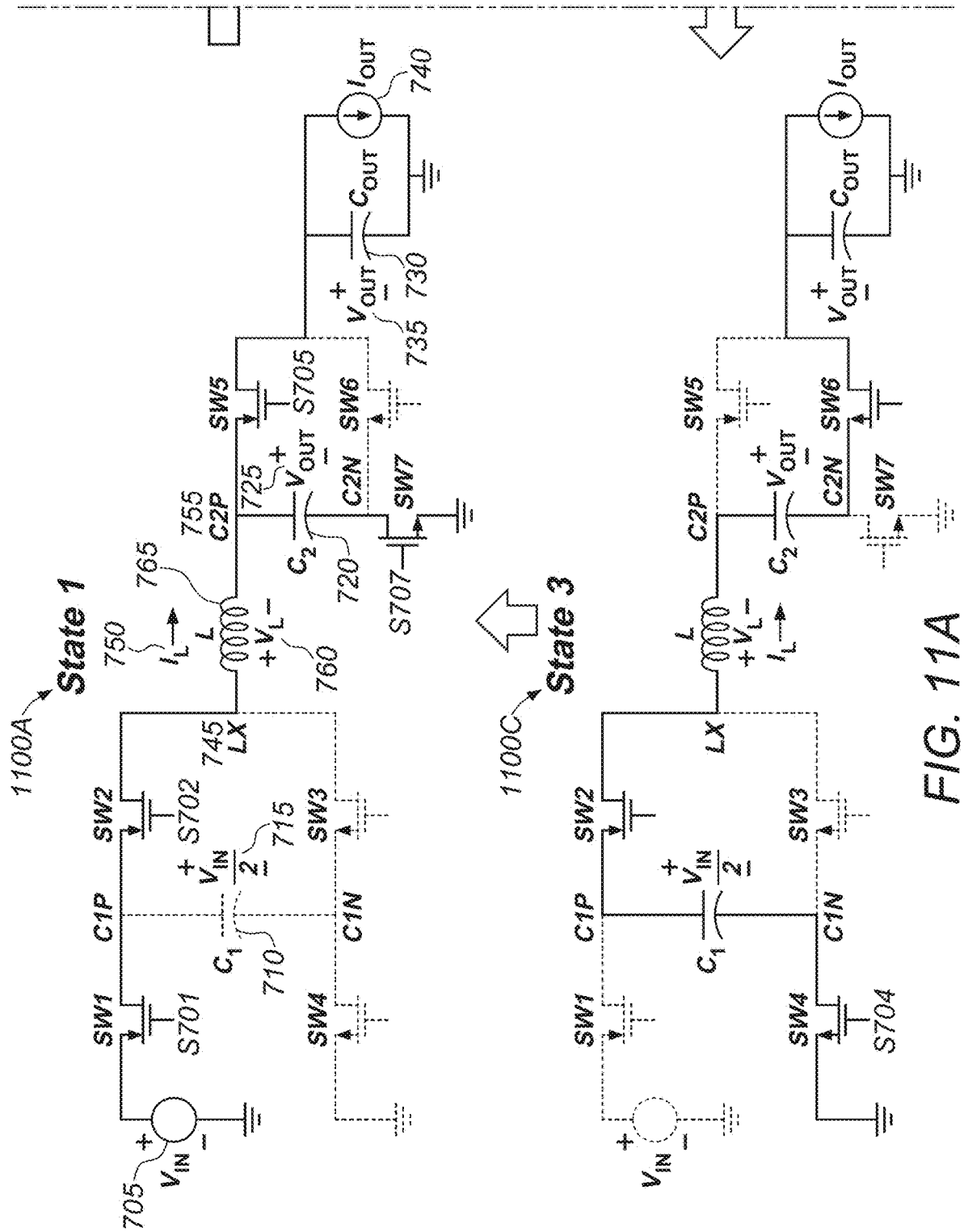
FIGS. 11A and 11B show operating states of a preferred power converter utilizing a single inductor coupling current source and two series-parallel switched-capacitor stages operating in upper-level parallel-series mode.
Figure 11B:
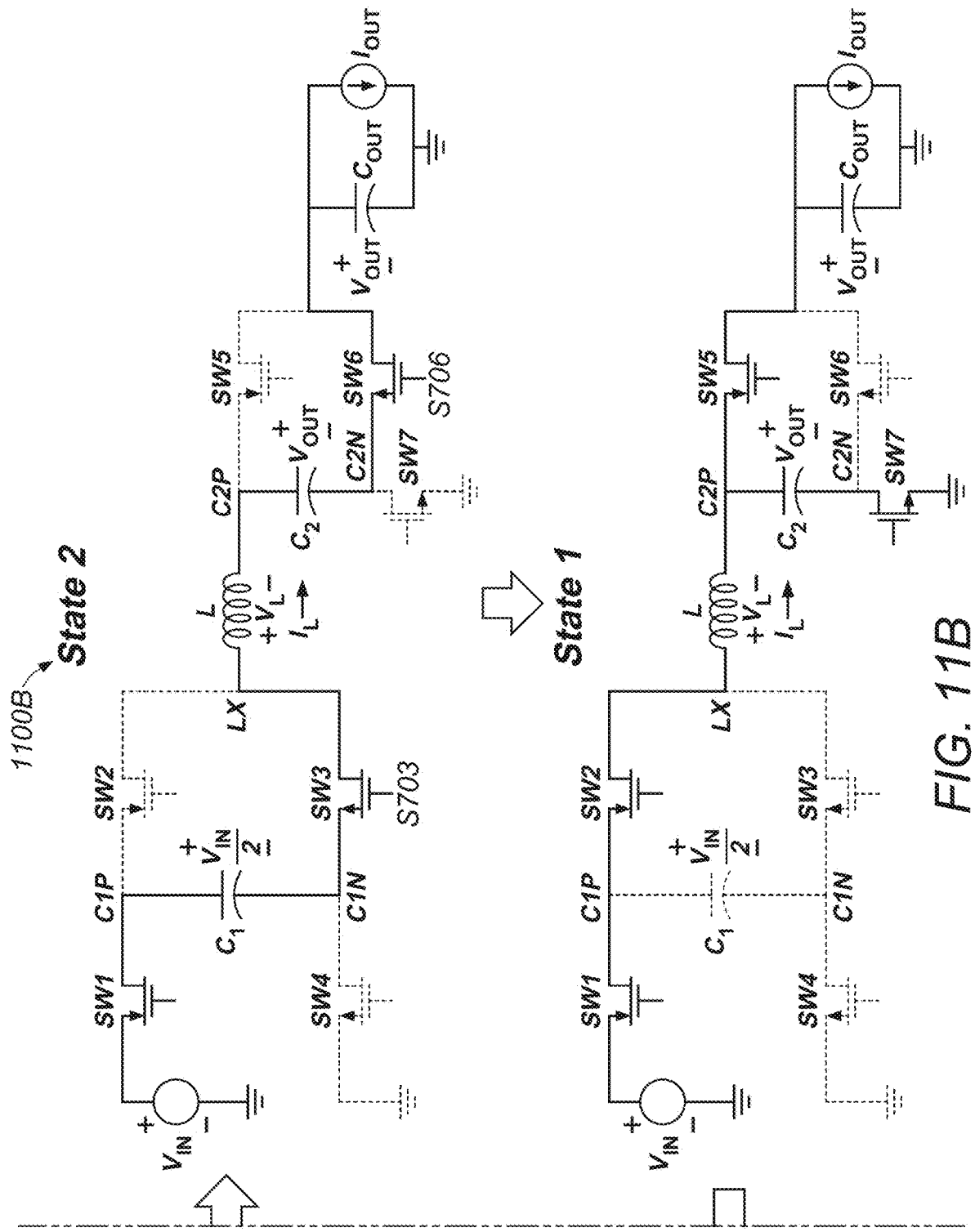
Figure 12:
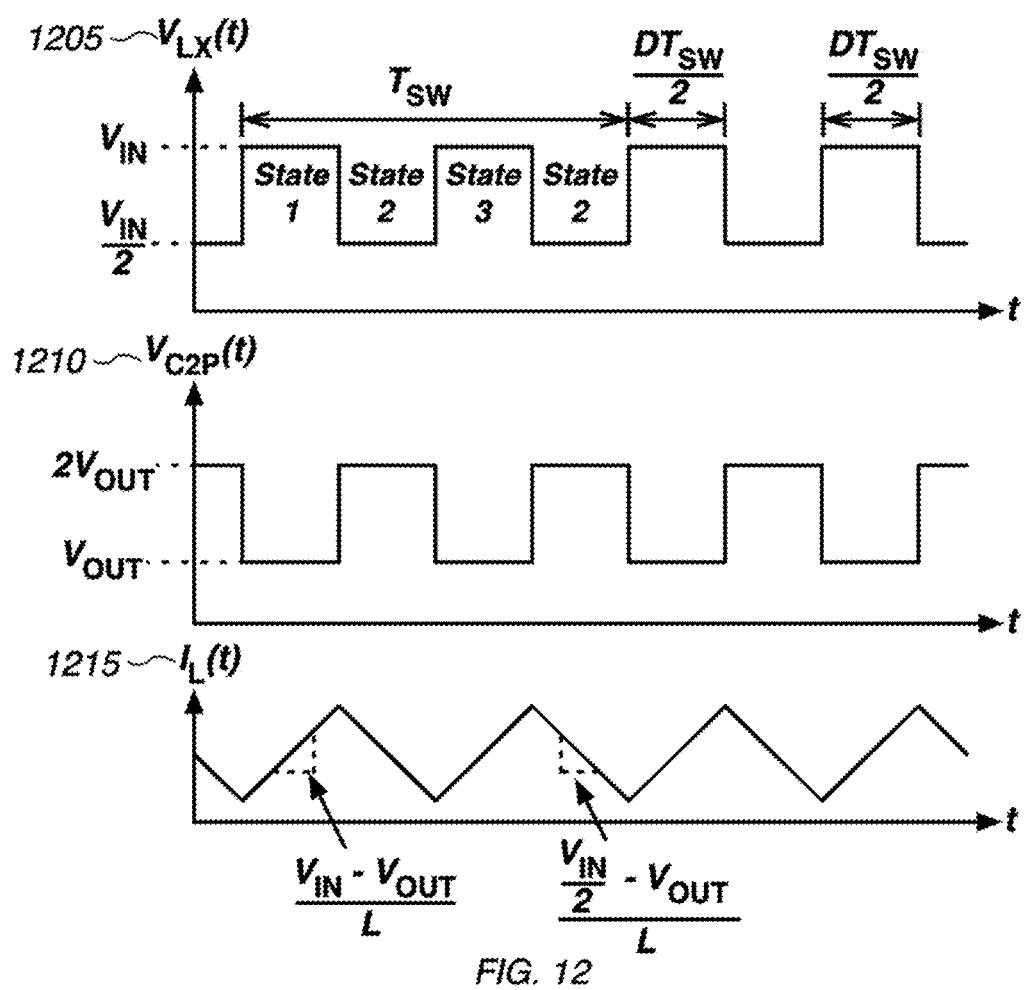
FIG. 12 shows operating waveforms of a preferred power converter utilizing a single inductor coupling current source and two series-parallel switched-capacitor stages operating in upper-level parallel-series mode.

FIGS. 11A-11B shows the operating states of the converter 600 while operating in UPS mode and FIG. 12 shows corresponding waveforms. In steady-state operation, the average voltages across the flying capacitors C1 710 and C2 720 are $V_{IN}/2$ and $V_{OUT}$ respectively. The UPS mode consists of the three operating states shown in FIGS. 11A-11B. In state 1 1100A, switches SW1 S701, SW2 S702, SW5 S705, and SW7 S707 are on resulting in the voltage at the LX node 1205 to be equal to $V_{IN}$ and the voltage at the C2P node 1210 to be equal to $V_{OUT}$. This results in the voltage across the inductor to be $$V_{IN} - V_{OUT}$$

Resulting in an inductor current 1215 ramp up rate of $$\frac{(V_{IN} - V_{OUT})}{L}.$$

During this time, the voltage across C1 710 is static and C2 720 discharges into the output node. In state 2 1100B, switches SW1 S701, SW3 S703, and SW6 S706 are on resulting in a LX node voltage 1205 equal to $V_{IN}/2$ and a C2P node voltage 1210 of $2V_{OUT}$. The inductor voltage is then $$V_{IN}/2 - 2V_{OUT}$$

and the inductor current 1215 ramps down at a rate of $$\frac{\frac{V_{IN}}{2} - 2V_{OUT}}{L}$$

while capacitors C1 710 and C2 720 are soft charged by the inductor current 750. State 1 1100A is then repeated and followed by state 3 1100C where switches SW2 S702, SW4 S704, and SW6 S706 are on resulting in an LX node voltage 1205 equal to $V_{IN}/2$ and a C2P node voltage 1210 of $2V_{OUT}$. The inductor current 1215 ramps down again at a rate equal to the rate of state 2 1100B while C1 710 and C2 720 are softly discharged and charged respectively by the inductor current 750. After state 3, the state sequence is then repeated.

Performing steady-state inductor volt-sec balance analysis, the resulting VCR for the UPS mode is $$M_{V\_UPS} = \frac{1+D}{2(2-D)}.$$

Analyzing the charge flow of the inductor 750 and flying capacitors 710 and 720, it can also be shown that $$M_{I\_UPS} = \frac{I_L}{I_{OUT}} = \frac{1}{2-D}.$$

From the inductor ramp rate expressions, it can also be shown that the peak-to-peak inductor current ripple is $$\Delta i_{L\_UPS} = \frac{V_{IN}}{2Lf_{SW}}(1 - M_{V\_UPS})\left(\frac{4M_{V\_UPS} - 1}{2M_{V\_UPS} + 1}\right).$$

Figure 13:
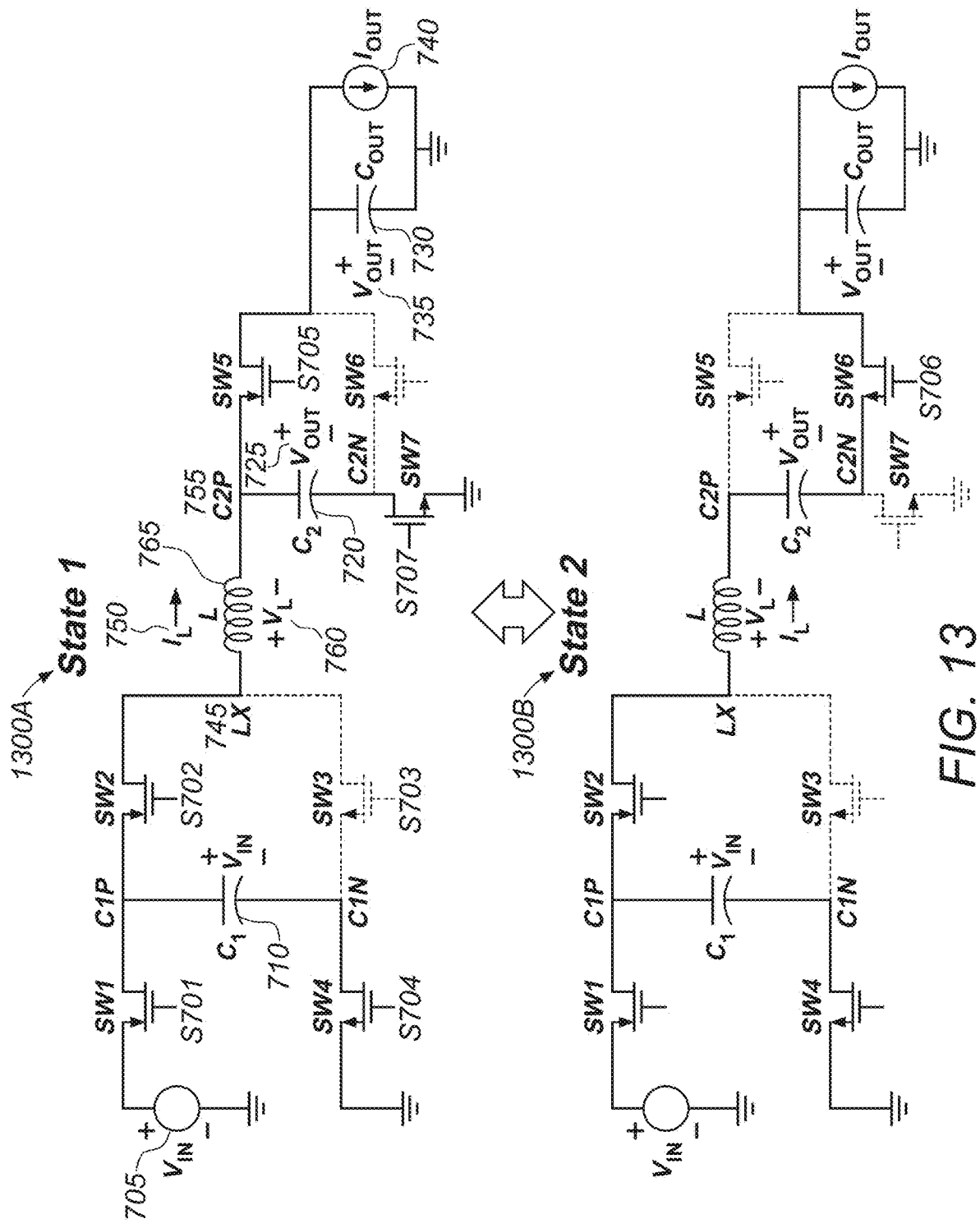
FIG. 13 shows operating states of a preferred power converter utilizing a single inductor coupling current source and two series-parallel switched-capacitor stages operating in bypass parallel-series mode.
Figure 14:
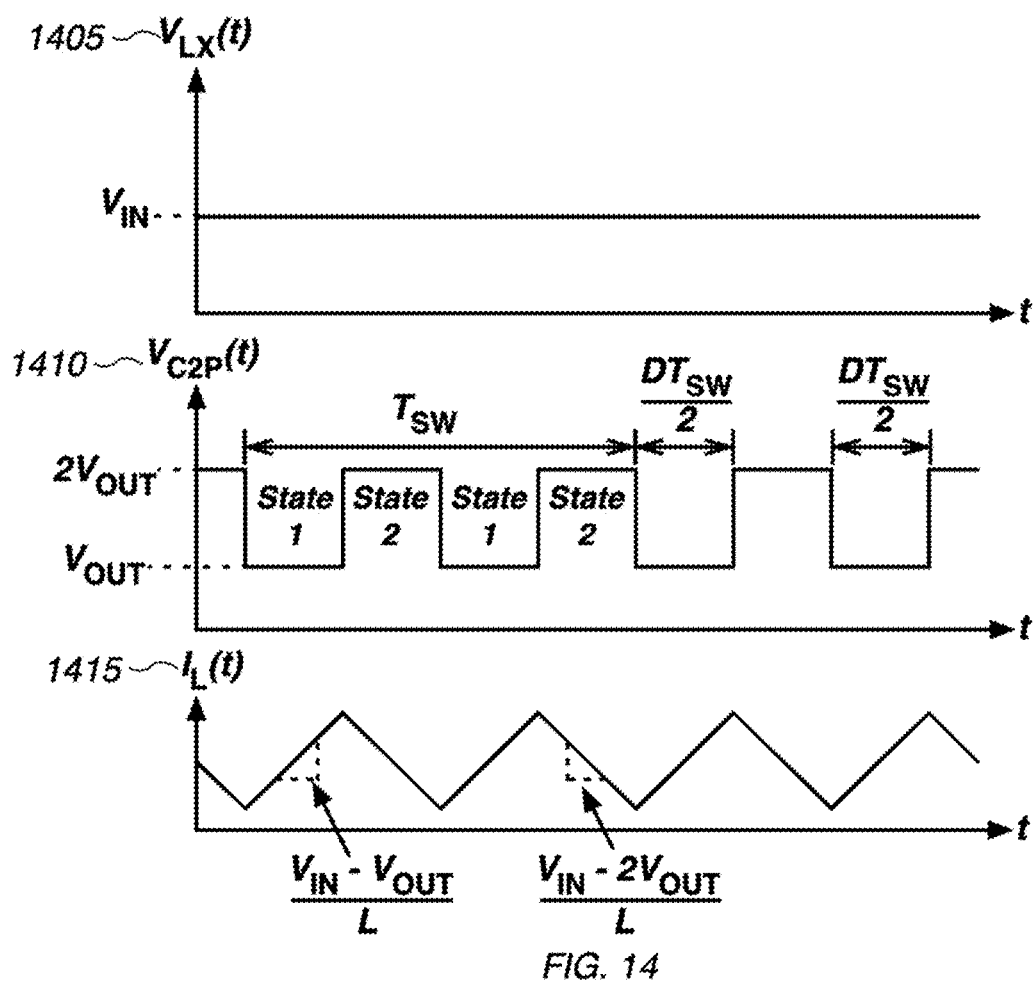
FIG. 14 shows operating waveforms of a preferred power converter utilizing a single inductor coupling current source and two series-parallel switched-capacitor stages operating in bypass parallel-series mode.

FIG. 13 shows the operating states of the converter 600 while operating in BPS mode and FIG. 14 shows corresponding waveforms. The BPS mode consists of the two operating states shown in FIG. 13. In both states, switches SW1 S701, SW2 S702, and SW4 S704 remain on and SW3 S703 remains off. C1 710 is repurposed as an input bypass capacitor, the LX node voltage 1405 is fixed at $V_{IN}$, and C2 720 has a steady-state average voltage of $V_{OUT}$. In state 1 1300A, switches SW5 S705, and SW7 S707 are on resulting in the voltage at the C2P node 1410 to be equal to $V_{OUT}$. This results in the voltage across the inductor being $$V_{IN} - V_{OUT}$$

Resulting in an inductor current 1415 ramp up rate of $$\frac{V_{IN} - V_{OUT}}{L}$$

while C2 720 discharges into the output node. In state 2 1300B, switch SW6 S706 is on resulting in a C2P node voltage 1410 of $2V_{OUT}$. The inductor voltage is then $$V_{IN} - 2V_{OUT}$$

causing the inductor current 1415 to ramp down at a rate of $$\frac{V_{IN} - 2V_{OUT}}{L}$$

while soft charging C2 720.

Performing steady-state inductor volt-sec balance analysis, the resulting VCR for the BPS mode is $$M_{V\_BPS} = \frac{1}{2-D}.$$

From the inductor ramp rate expressions, it can also be shown that the peak-to-peak inductor current ripple is $$\Delta i_{L\_BPS} = \frac{V_{IN}}{2Lf_{SW}}\left(3 - \frac{1}{M_{V\_BPS}} - 2M_{V\_BPS}\right).$$

Note $f_{SW}$ in the above expression is defined using the same $T_{SW}$ specified in the previous modes illustrated in FIGS. 8, 10, and 12.

Analyzing the steady-state charge flow of the inductor 765 and C2 720, it can also be shown that $$M_{I\_BPS} = \frac{I_L}{I_{OUT}} = \frac{1}{2-D}.$$

As can be seen in the expressions $M_{I\_LSP}$, $M_{I\_LPS}$, $M_{I\_UPS}$, and $M_{I\_BPS}$, this converter illustrates the average inductor current is a scaled down version of the average output current.

Figure 15:
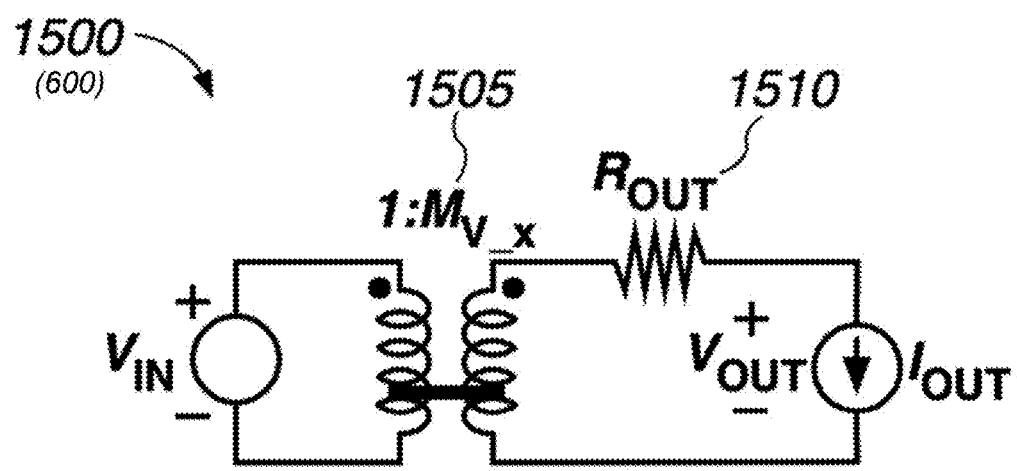
FIG. 15 illustrates an ideal DC transformer model for a preferred power converter.
Figure 16:
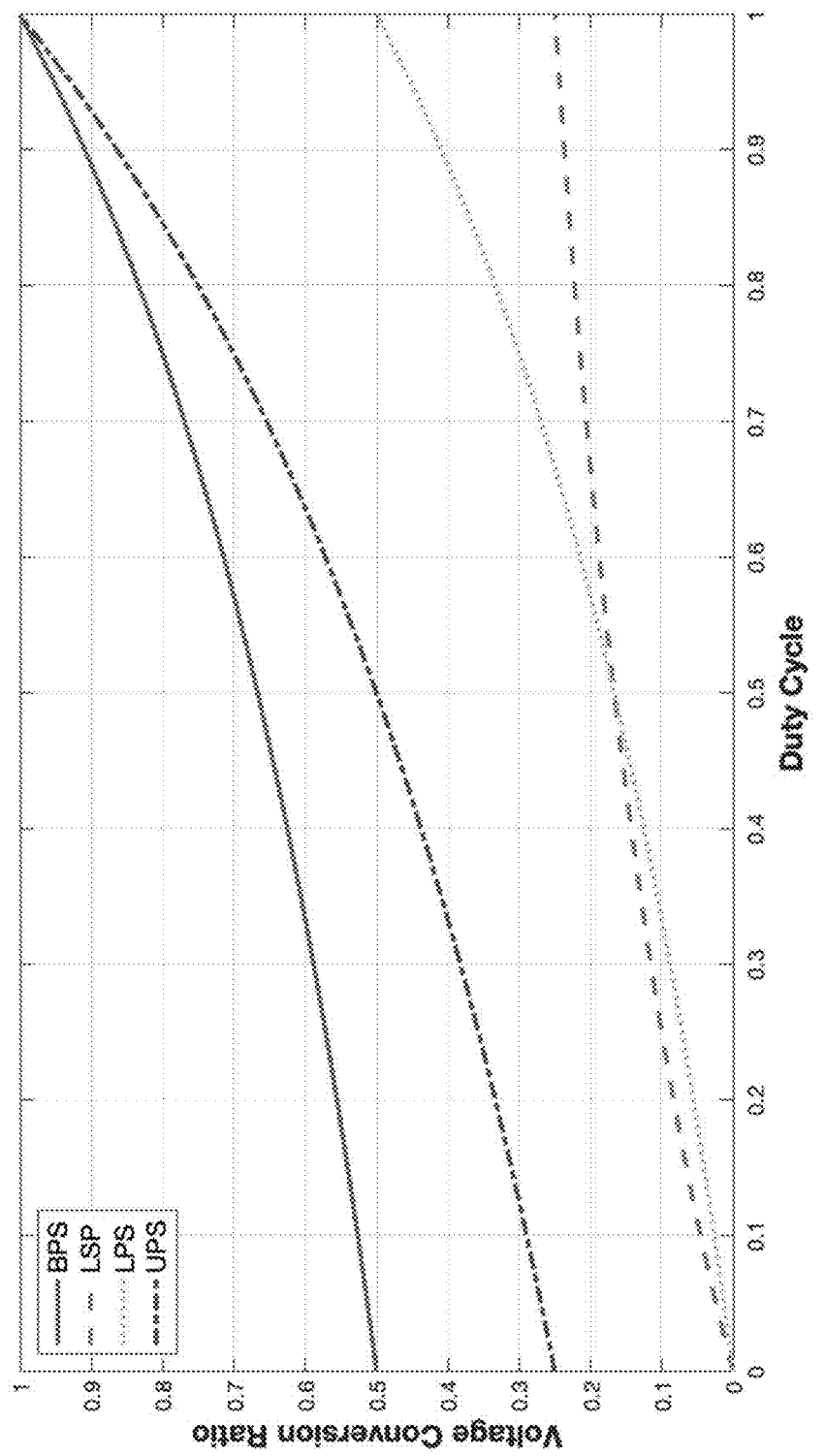
FIG. 16 shows voltage conversion ratio versus duty cycle behavior of a preferred power converter utilizing a single inductor coupling current source and two series-parallel switched-capacitor stages operating in lower-level series-parallel mode, lower-level parallel-series mode, upper-level parallel-series mode, and bypass parallel-series mode.

As will be apparent to artisans, the converter 600 can use its multiple modes to optimize converter operation in terms of VCR requirements and power efficiency. As shown in FIG. 15, the converter 600 can be modeled as an ideal DC transformer 1500 whose turns ratio, $M_{V\_x}$ 1505, is equal to the ideal VCR for the selected operating mode and $R_{OUT}$ 1510 is a lumped resistance that models the load current dependent conduction losses of the converter for the selected operating mode. FIG. 16 shows the VCR versus duty cycle and modes showing that all VCRs ranging from near zero to near unity are realizable.

Figure 17A:
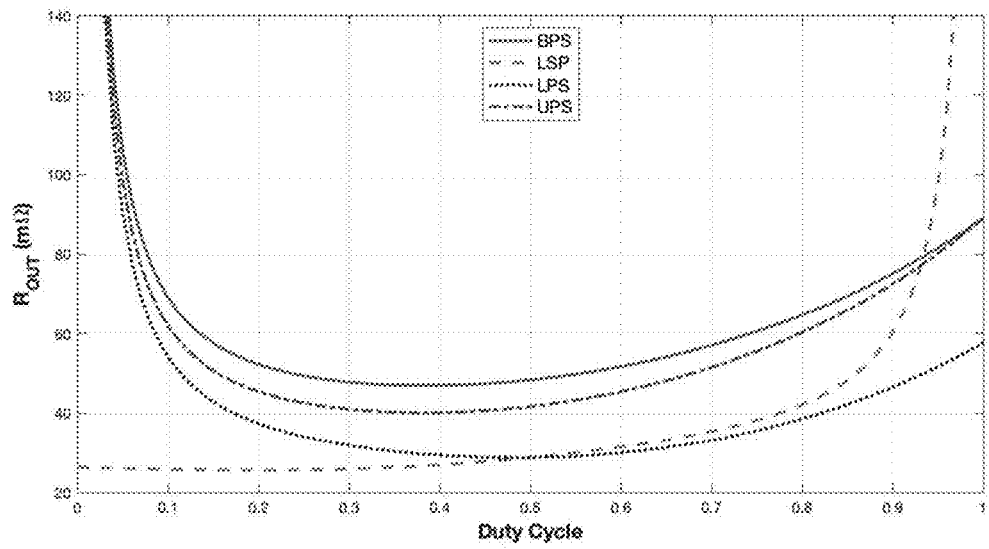
FIGS. 17A-17B shows output resistance versus duty cycle and voltage conversion ratio behavior of a preferred power converter utilizing a single inductor coupling current source and two series-parallel switched-capacitor stages operating in lower-level series-parallel mode, lower-level parallel-series mode, upper-level parallel-series mode, and bypass parallel-series mode.
Figure 17B:
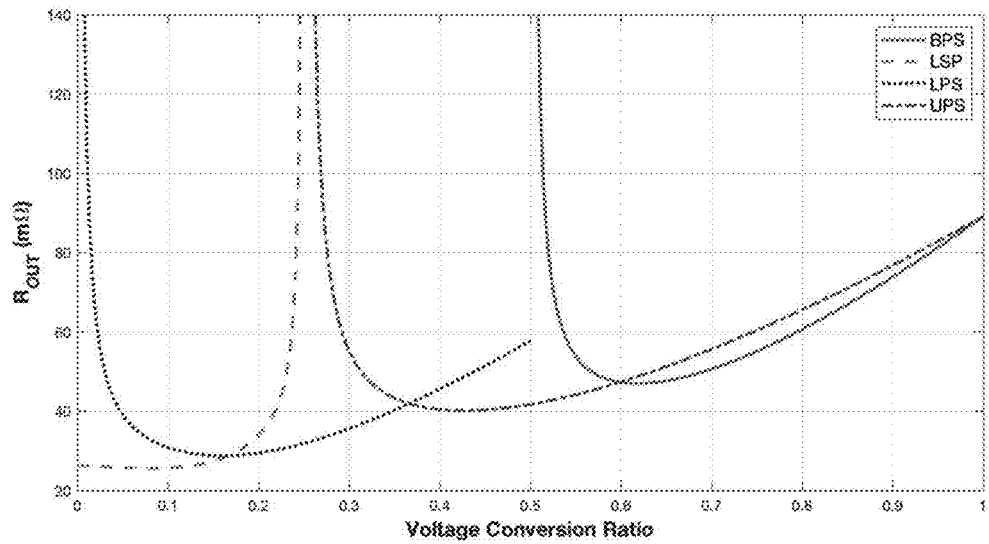

FIGS. 17A-B illustrate the $R_{OUT}$ behavior across duty cycle, VCR, and modes for an example converter of the invention. Like many conventional DC-DC converters, the $R_{OUT}$ value is dependent on the VCR, but a converter of the invention with inductor coupling current sources provides the flexibility of selecting a mode that both meets the application VCR requirements and minimizes the effective $R_{OUT}$ of the converter and associated conduction losses.

Figure 18:
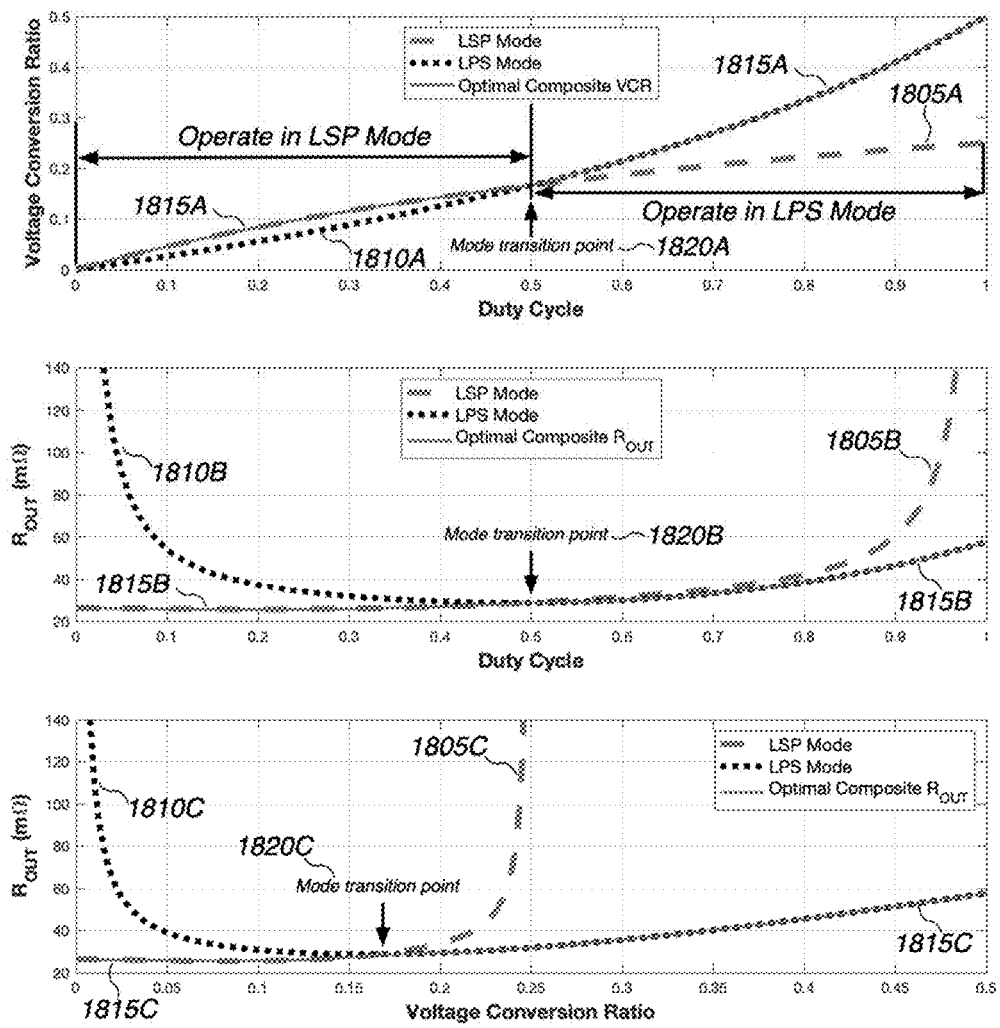
FIG. 18 shows a voltage conversion ratio versus duty cycle, output resistance versus duty cycle, and output resistance versus voltage conversion ratio behavior of a power converter utilizing a single inductor coupling current source and two series-parallel switched-capacitor stages operating in lower-level series-parallel and lower-level parallel-series modes with the optimal mode transition point and corresponding composite voltage conversion ratio and output resistance curves.

To elucidate the value of this aspect of the invention, the VCRs and equivalent output resistances of the LSP 1805A-C and LPS 1810A-C modes of the example converter are re-drawn in FIG. 18. As illustrated with the composite VCR and $R_{OUT}$ curves 1815A-C, the controller of the example converter would select the mode that yields the desired VCR and lowest $R_{OUT}$ which in this example would correspond near the 0.5 duty cycle operating point 1820A-C. In other words, the controller would select LSP mode when the duty cycle is less than 0.5 and LPS mode when greater than 0.5. For 0.5 duty cycle, either mode would suffice.

Figure 19:
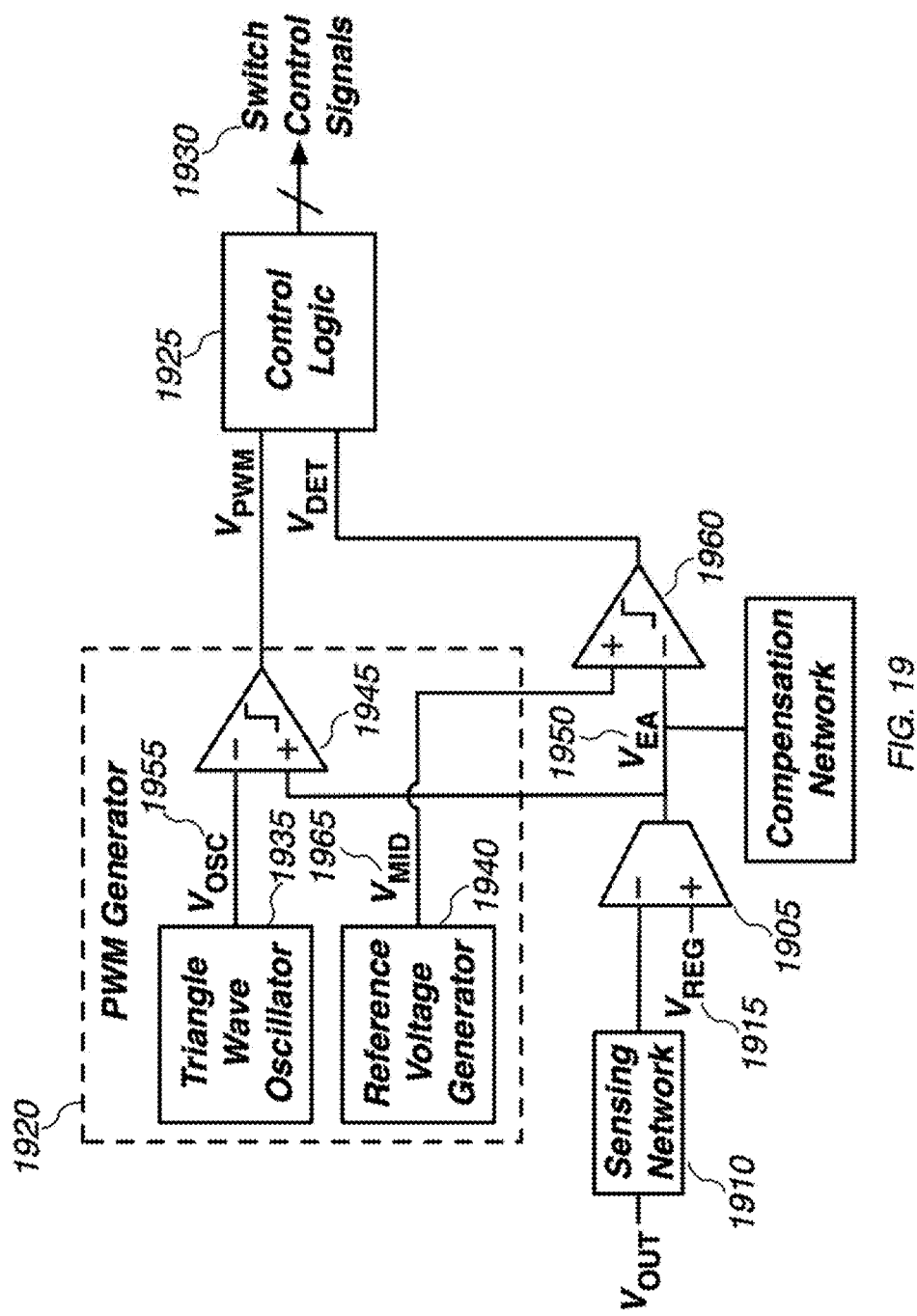
FIG. 19 shows a high-level implementation of a preferred pulse-width modulator with duty cycle level detection.

In this example converter, for the LSP to LPS mode transitions, the VCRs and output resistances for these two modes overlap at the 0.5 duty cycle point so the mode controller can easily detect the appropriate transition point by monitoring the appropriate signal that corresponds to this event. FIG. 19 shows a preferred converter controller. For this example, the output voltage of the converter is regulated by a control loop consisting of an error amplifier 1905, output voltage sensor network 1910, regulation reference voltage 1915, PWM generator 1920, and logic circuits 1925 needed to produce the required power switch control signals 1930. The PWM generator 1920 consists of a triangle wave oscillator 1935, a reference voltage generator 1940, and voltage comparator 1945. To generate the PWM power switch control signals 1930, the output of the error amplifier 1950 is compared to the oscillator output 1955. Therefore, the error amplifier output level is effectively proportional to the duty cycle of the converter.

Figure 20:
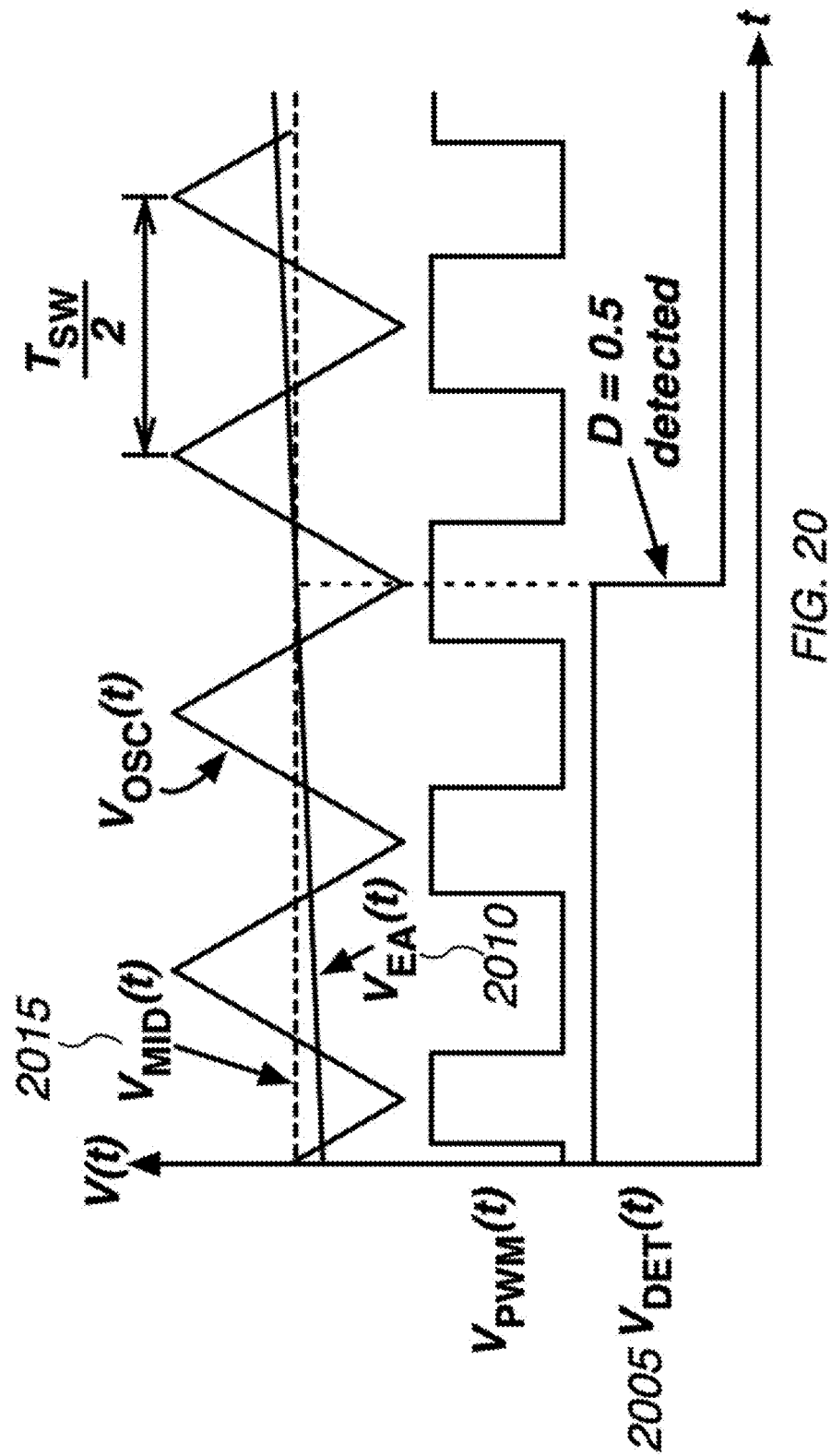
FIG. 20 shows operating waveforms of a preferred implementation of a pulse-width modulator with duty cycle level detection.

Associated operating signals for the FIG. 19 control are shown in FIG. 20. To detect this 0.5 duty cycle level, the error amplifier 1905 is monitored by another voltage comparator 1960 that compares the level to the oscillator reference voltage 1965 whose level is equal to the average value of the oscillator signal. Therefore, the comparator output 2005 asserts when the error amplifier output 2010 is greater than the oscillator reference voltage 2015 and de-asserts when less than the oscillator reference voltage 2015. An amount of hysteresis can be utilized by the comparator 1960 to ensure stable detection behavior when both signals are equal.

Figure 21:
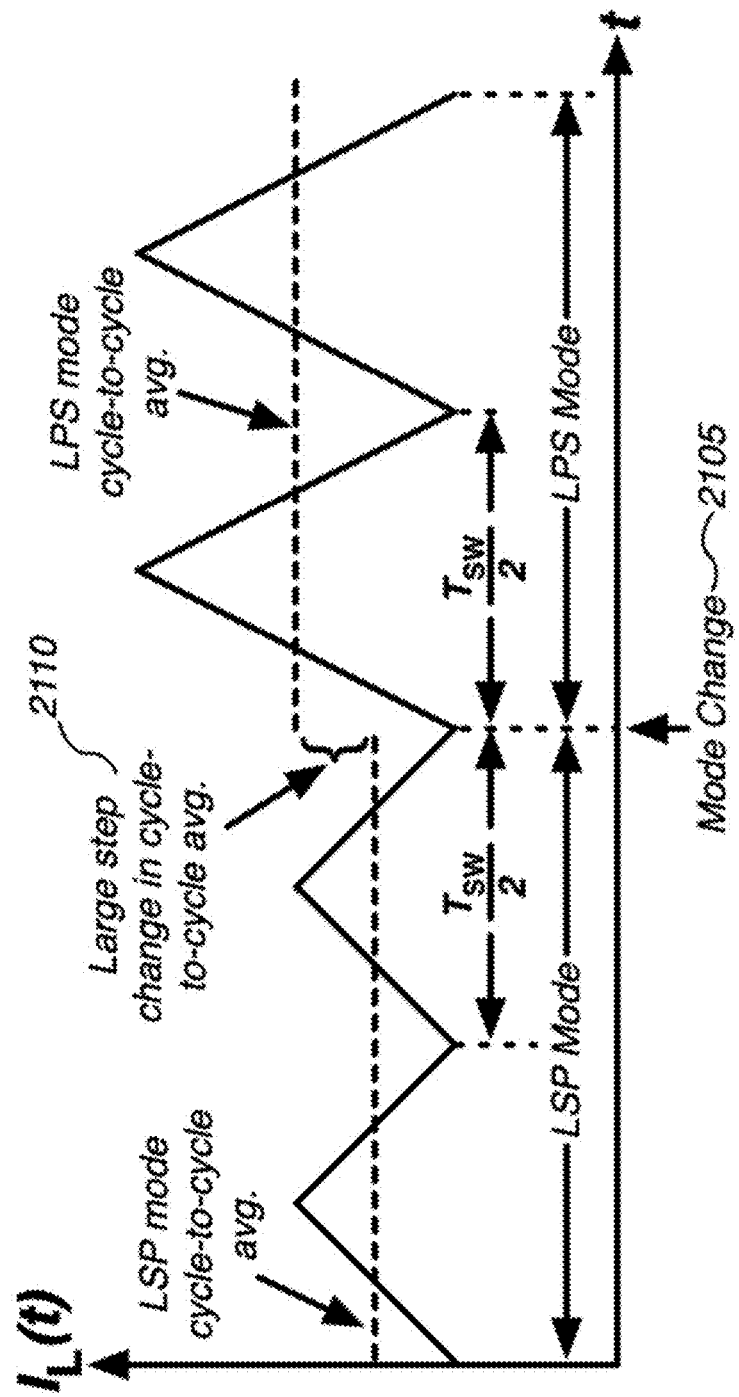
FIG. 21 shows inductor current waveform of a preferred power converter utilizing a single inductor coupling current source and two series-parallel switched-capacitor stages operating transitioning from lower-level series-parallel mode to lower-level parallel-series mode resulting in a large step change in the cycle-to-cycle average of the inductor current.

In addition to detecting the 0.5 duty cycle level, care must also be taken to ensure proper transitioning of the power switch control signals and state-variables of the reactive elements in the converter when updating the operating mode during normal operation. The inductor coupling current source current is a state-variable that should be gradually transitioned to minimize excessive output voltage perturbations. Examining the $\Delta i_{L\_LSP}$, $\Delta i_{L\_LPS}$, $M_{I\_LSP}$, and $M_{I\_LPS}$ expressions, it can be seen that the average inductor currents for the two modes are equal at 50% duty cycle but the inductor ripple amplitude in LPS mode is larger by a factor of two compared to the LSP mode ripple amplitude. FIG. 21 shows an example where the LSP to LPS mode change occurs directly at the end of the LSP mode cycle 2105. Assuming the converter switching frequency is much higher than the control loop bandwidth (i.e., the PWM duty cycle remains approximately constant over a switching period), the larger applied inductor voltage in LPS mode results in an inductor coupling current source current increase with twice the slope compared to LSP. This creates a sudden step increase in the cycle-to-cycle average inductor current 2110. It would then take numerous switching cycles for the average inductor current to stabilize to the correct steady-state value; resulting in an undesirably large output voltage transient.

Figure 22A:
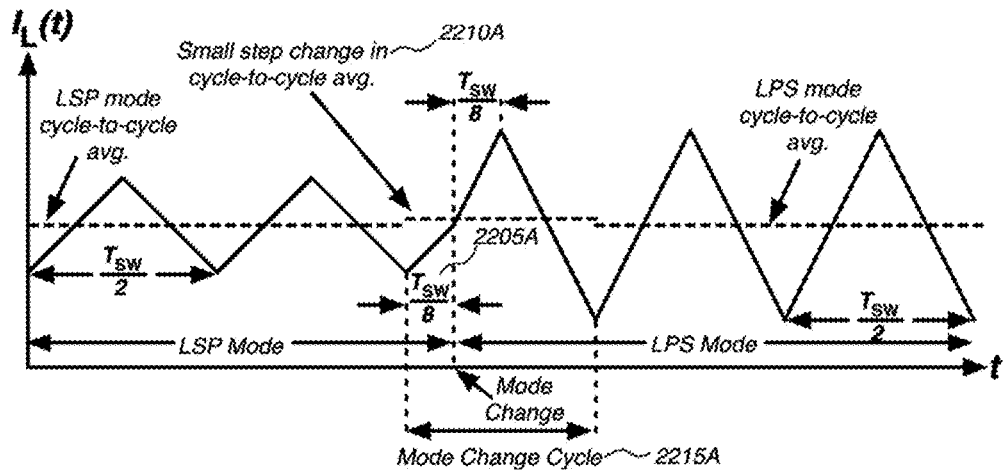
FIGS. 22A and 22B show inductor current waveform of a preferred power converter utilizing a single inductor coupling current source and two series-parallel switched-capacitor stages operating transitioning from lower-level series-parallel mode to lower-level parallel-series mode and vice versa resulting in a small step change in the cycle-to-cycle average of the inductor current.
Figure 22B:
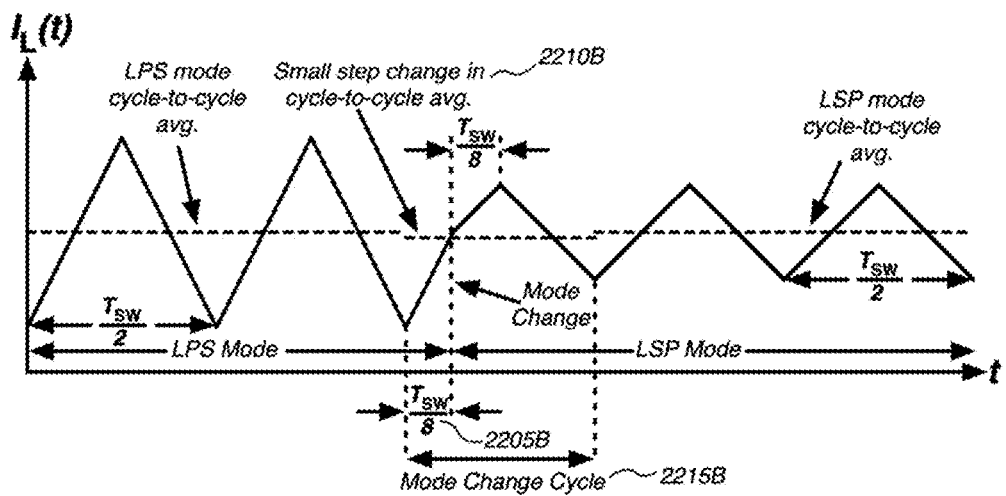

A control method of shaping the inductor coupling current source current to minimize perturbation is provided in FIG. 22. As shown in FIG. 19, the comparator 1960 output indicates when a mode transition should occur. However, to ensure a smooth transition of the inductor current to the new operating mode, the converter power stage is configured in the previous mode for a time duration of $T_{SW}/8$ 2205A-B at the beginning of a new PWM cycle. The control logic then proceeds to the next mode for the remainder of the PWM cycle. This control method effectively minimizes the change in the average inductor current value 2210A-B during the transition mode cycle 2215A-B.

Figure 23:
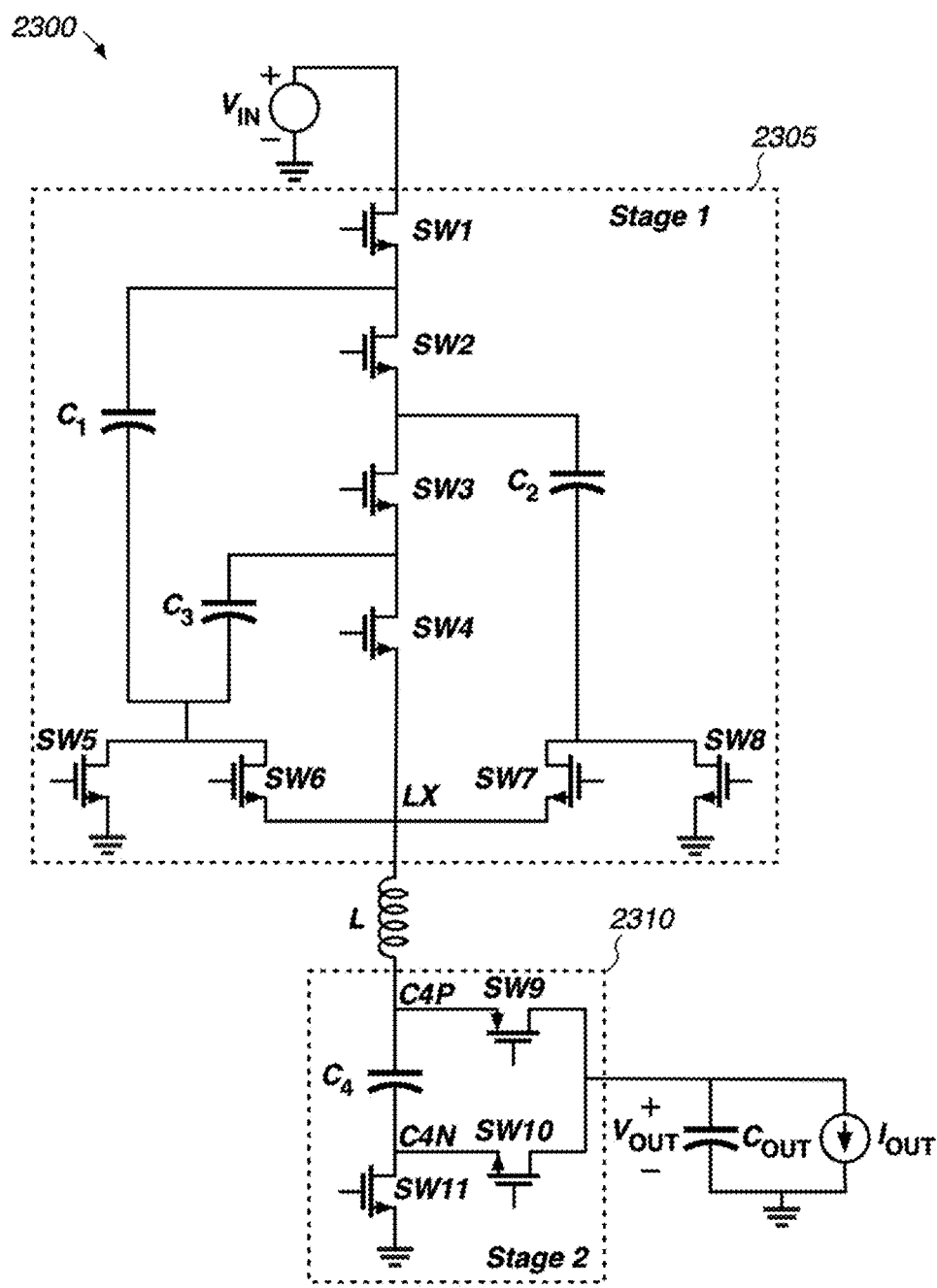
FIG. 23 shows a detailed implementation of a preferred power converter utilizing a single inductor coupling current source Dickson switched-capacitor stage, and a series-parallel switched-capacitor stage.

FIG. 23 is a circuit diagram of a preferred two-stage converter with an inductor coupling current source. The FIG. 23 converter utilizes both PMOS and NMOS MOSFET power switches, but the switch type(s) are a matter of design choice. The first stage 2305 utilizes a Dickson SC topology while the second stage 2310 utilizes a series-parallel SC topology. Two operating modes provide two unique VCRs. The modes are referred to as Dickson Series-Parallel (DSP) and Dickson Parallel-Series (DPS) with each mode consisting of 3 operating states. FIGS. 24-27 show the operating states and corresponding operating waveforms. The steady-state average capacitor voltages for C1-C4 C2401-C2104 are $$\frac{3V_{IN}}{4}2405, \frac{V_{IN}}{2}2410, \frac{V_{IN}}{4}2415,$$

and $V_{OUT}$ 2420 respectively.

Figure 24:
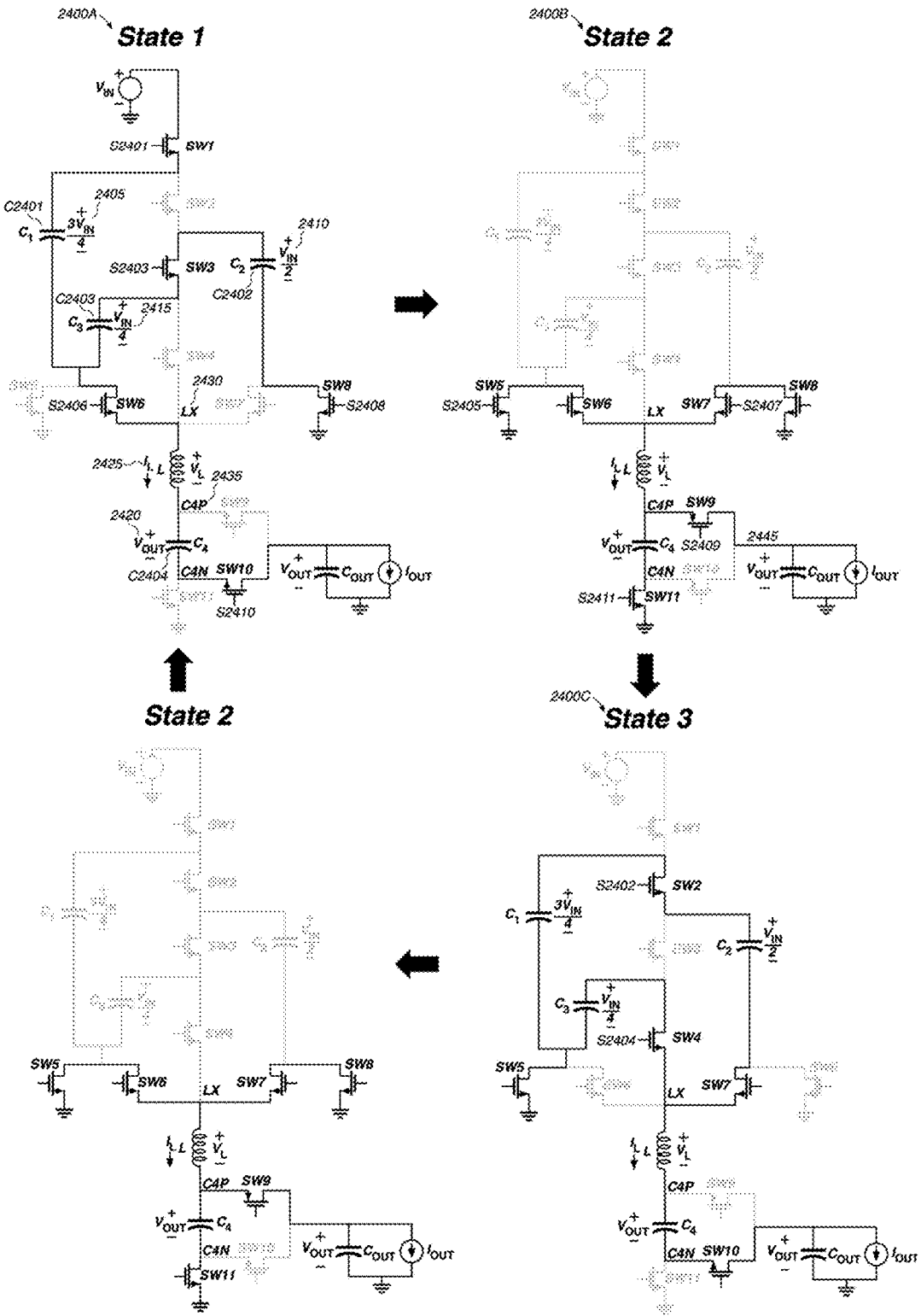
FIG. 24 shows operating states of a preferred power converter utilizing a single inductor coupling current source, star Dickson switched-capacitor stage, and a series-parallel switched-capacitor stage while operating in Dickson series-parallel mode.
Figure 25:
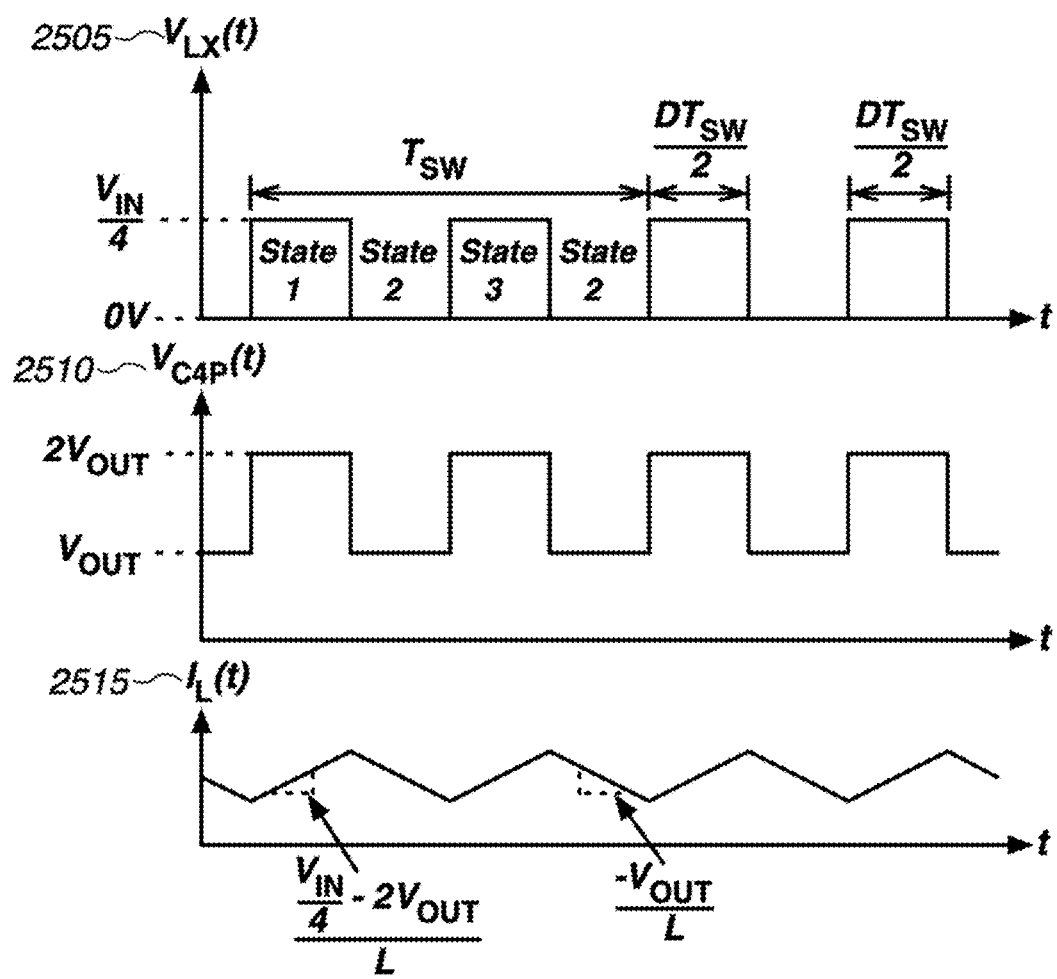
FIG. 25 shows operating waveforms of a preferred power converter utilizing a single inductor coupling current source, star Dickson switched-capacitor stage, and a series-parallel switched-capacitor stage while operating in Dickson series-parallel mode.

The operating states for DSP mode are shown in FIG. 24. In state 1 2400A, SW1 S2401, SW3 S2403, SW6 S2406, SW8 S2408, and SW10 S2410 are on. Capacitors C1 C2401, C3 C2403, and C4 C2404 are soft charged by the inductor current 2425 while C2 C2402 is softly discharged by the inductor current 2425. This results in a voltage of $V_{IN}/4$ to be applied to the LX node 2505 and $2V_O$ to the C4P 2510 node and the inductor current 2515 ramps up at a rate of $$\frac{\frac{V_{IN}}{4} - 2V_{OUT}}{L}.$$

In state 2 2400B, SW5-SW9 S2405-S2409 and SW11 S2411 turn on resulting in a LX node voltage 2505 of 0V and a C4P node voltage 2510 of $V_{OUT}$. The inductor current 2515 ramps down at a rate of $-V_{OUT}/L$ while C4 C2404 discharges into the output node 2445 and the C1-C3 2405-2410 voltages remain static. In state 3 2400C, SW2 S2402, SW4 S2404, SW5 S2405, SW7 S2407, and SW10 S2410 are on. Capacitors C1 C2401 and C3 C2403 are softly discharged by the inductor current 2425 while C2 C2402 and C4 C2404 are soft charged by the inductor current 2425. This produces an LX node voltage 2505 of $V_{IN}/4$ and a C4P node voltage 2510 of $2V_{OUT}$; resulting in an inductor current 2515 ramp up rate of $$\frac{\frac{V_{IN}}{4} - 2V_{OUT}}{L}.$$

State 2 2400B then occurs again and the state sequence is repeated.

Performing volt-sec balance and charge flow analysis, the VCR and average inductor current-to-average output current expressions can be derived as $$M_{V\_DSP} = \frac{D}{4(1+D)}$$

$$M_{I\_DSP} = \frac{1}{1+D}$$

respectively. The inductor current can also be derived as $$\Delta i_{L\_DSP} = \frac{V_{IN}}{2Lf_{SW}} \frac{M_{V\_DSP} - 8(M_{V\_DSP})^2}{1 - 4M_{V\_DSP}}.$$

Figure 26:
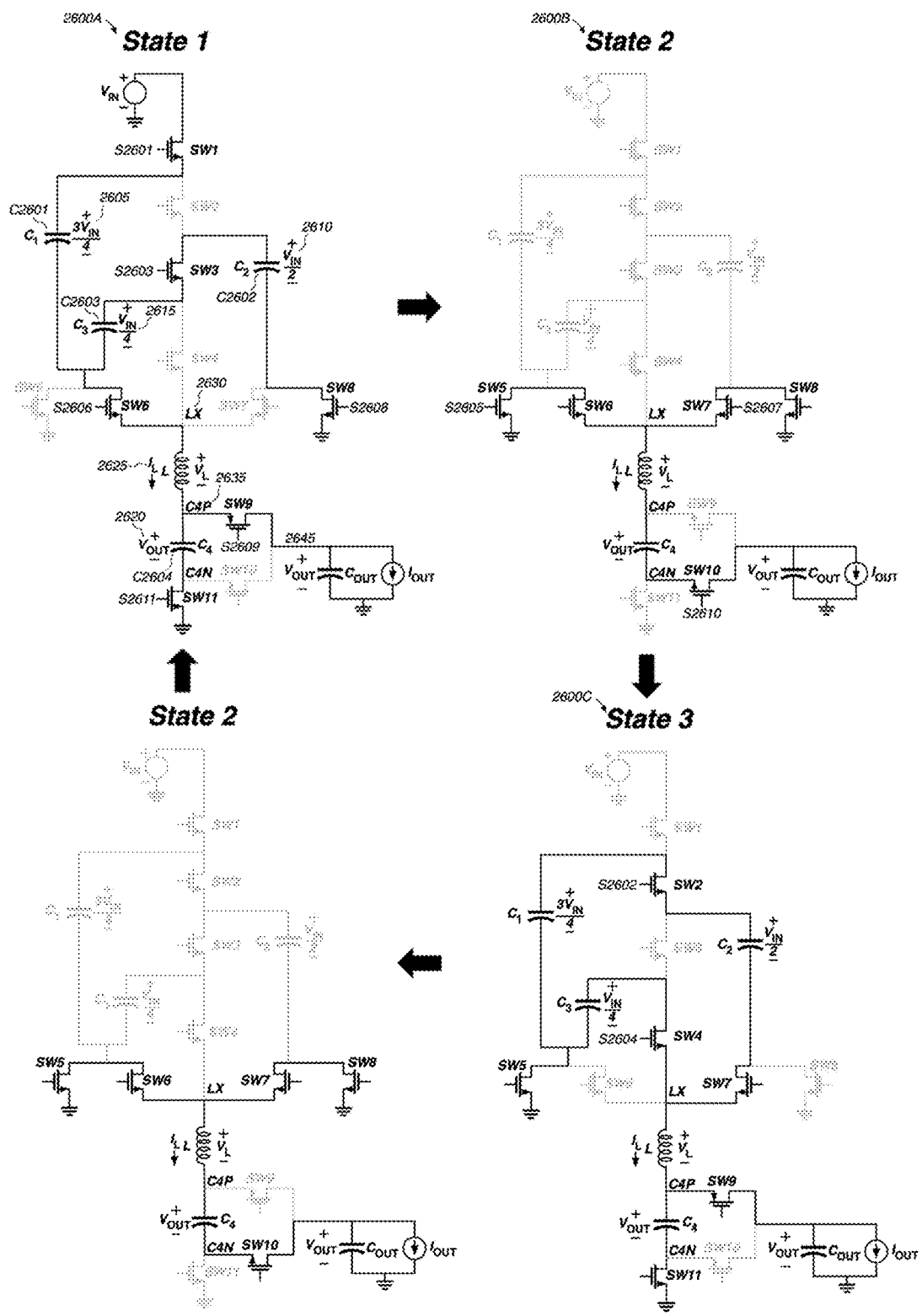
FIG. 26 shows operating states of a preferred power converter utilizing a single inductor coupling current source, star Dickson switched-capacitor stage, and a series-parallel switched-capacitor stage while operating in Dickson parallel-series mode.
Figure 27:
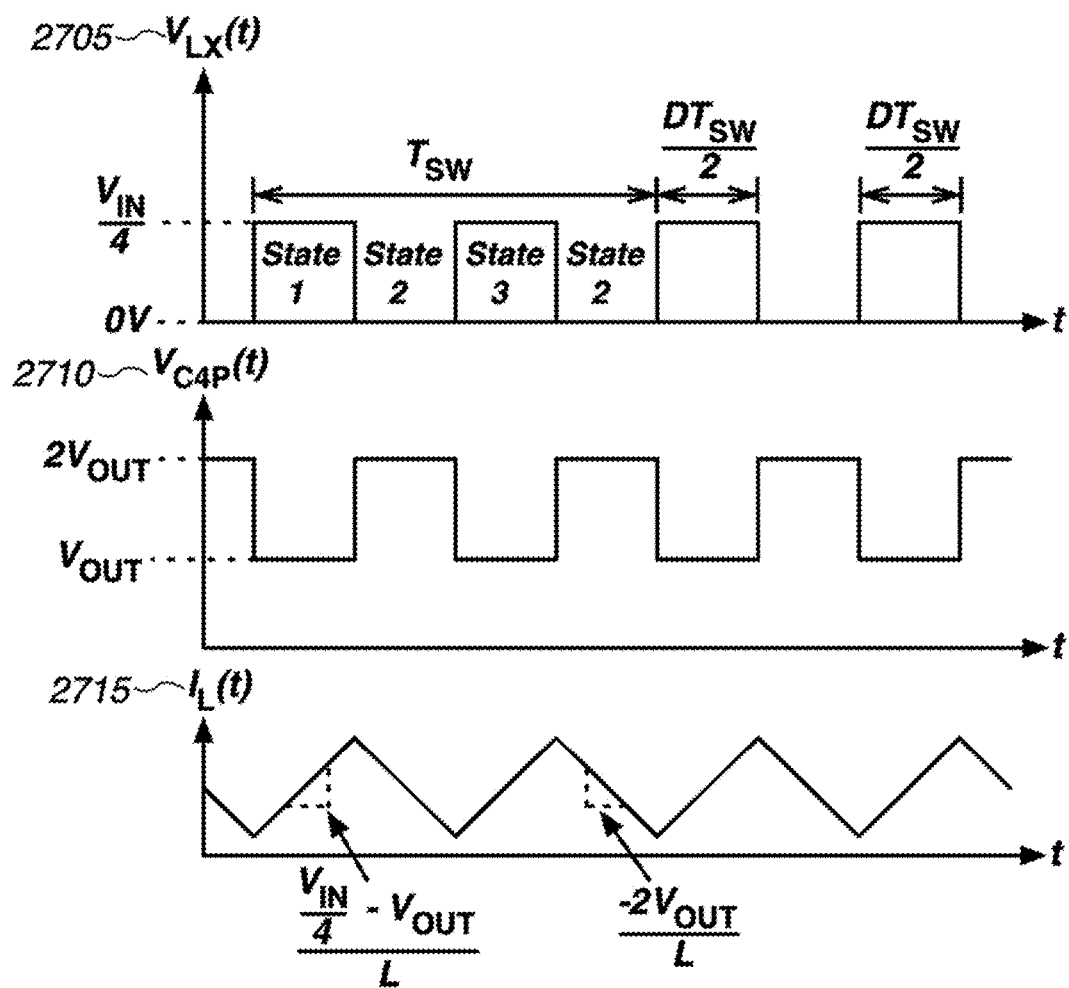
FIG. 27 shows operating waveforms of a preferred power converter utilizing a single inductor coupling current source, star Dickson switched-capacitor stage, and a series-parallel switched-capacitor stage while operating in Dickson parallel-series mode.

The operating states for DPS mode are shown in FIG. 26. In state 1 2600A, SW1 S2601, SW3 S2603, SW6 S2606, SW8 S2608, SW9 S2609, and SW11 S2611 are on. Capacitors C1 C2601 and C3 C2603 are soft charged by the inductor coupling current source current 2625 while C2 C2602 is softly discharged by the inductor coupling current source current 2625 and C4 C2604 discharged into the output node 2645. This results in a voltage of $V_{IN}/4$ to be applied to the LX node 2705 and $V_{OUT}$ to the C4P node 2710 and the inductor current 2715 ramps up at a rate of $$\frac{\frac{V_{IN}}{4} - V_{OUT}}{L}.$$

In state 2 2600B, SW5-SW8 S2605-S2608 and SW10 S2610 turn on resulting in an LX node voltage 2705 of 0V and a C4P node voltage 2710 of $2V_{OUT}$. The inductor coupling current source current 2715 ramps down at a rate of $-2V_{OUT}/L$ while C4 C2604 is softly charged by the current 2625 and the C1-C3 voltages 2605, 2610, 2615 remain static. In state 3 2600C, SW2 S2602, SW4 S2604, SW5 S2605, SW7 S2607, SW9 S2609, and SW11 S2611 are on. Capacitors C1 C2601 and C3 C2603 are soft discharged by the inductor coupling current source current 2625 while C2 C2605 is soft charged by the inductor coupling current source current 2625 and C4 C2604 discharges into the output node 2645. This produces an LX node voltage 2705 of $V_{IN}/4$ and a C4P node voltage 2710 of $V_{OUT}$; resulting in an inductor coupling current source ramp up rate of $$\frac{\frac{V_{IN}}{4} - V_{OUT}}{L}.$$

State 2 2600B then occurs again and the state sequence is repeated.

Performing volt-sec balance and charge flow analysis, the VCR and average inductor coupling current source current-to-average output current expressions can be derived as $$M_{V\_DPS} = \frac{D}{4(2-D)}$$

$$M_{I\_DPS} = \frac{1}{2-D}$$

respectively. The inductor current can also be derived as $$\Delta i_{L\_DPS} = \frac{V_{IN}}{2Lf_{SW}} \frac{2M_{V\_DPS} - 8(M_{V\_DPS})^2}{1 + 4M_{V\_DPS}}.$$

Figure 28:
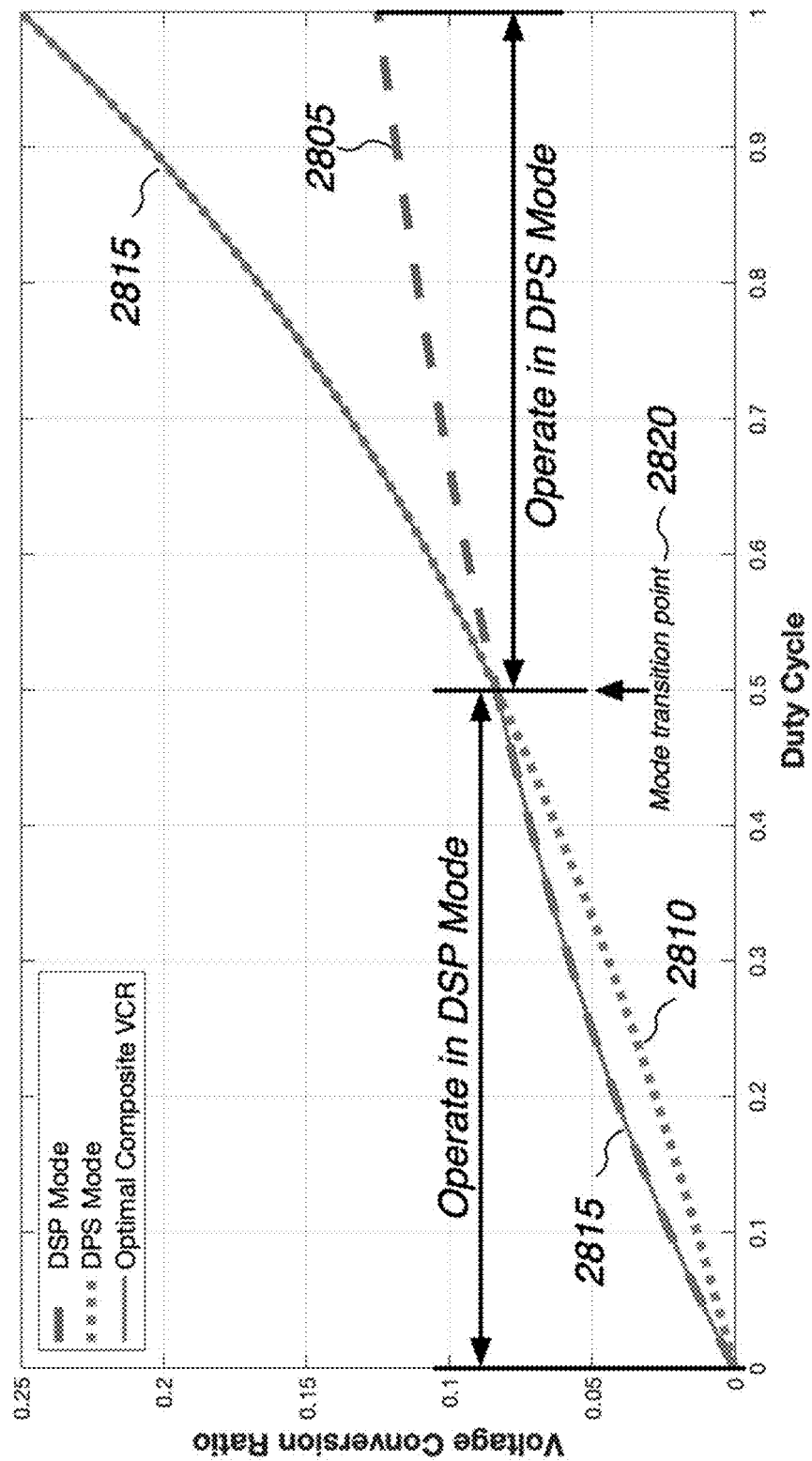
FIG. 28 shows voltage conversion ratio of a preferred power converter utilizing a single inductor coupling current source, star Dickson switched-capacitor stage, and a series-parallel switched-capacitor stage while operating in Dickson series-parallel and Dickson parallel-series modes with the optimal mode transition point and corresponding composite voltage conversion ratio curve.

FIG. 28 shows a plot of the VCR versus duty cycle for DSP mode 2805, DPS mode 2810, and a composite VCR 2815 if an automatic mode control was implemented as in the first embodiment described previously. Substantial increases in VCR values are realized while still maintaining average inductor currents less than or equal to the average output current as indicated in the $M_{I\_DSP}$ and $M_{I\_DPS}$ expressions. Control methods described above can be leveraged to automate the optimal mode and state-variable transitions.

While detailed descriptions of implementation examples have been described above, it should be emphasized that these are only particular examples of the plurality of embodiments offered by the invention. Those skilled in the art could implement numerous variations and modifications of the disclosed embodiments that fall within the spirit or scope of this invention.

The invention claimed is:

1. A multi-stage DC-DC power converter, comprising:
   a first switched-capacitor stage driven by an input voltage;
   a second switched-capacitor stage coupled to the first switched-capacitor by an inductor coupling current source, and
   a controller to control charging and discharging of a flying capacitor by the inductor coupling current source in each of the first and second switched-capacitor stages, wherein the controller operates such that:
   each of the flying capacitors of the first and second switched-capacitor stages is soft charged by the inductor coupling current source and a frequency of a switched voltage across the inductor coupling current source is maintained to be high enough to limit inductor current ripple to be negligible compared to its DC component and ensure average inductor current is effectively reduced by factor equal to a voltage conversion ratio of the second switched-capacitor stage.

2. The multi-stage DC-DC power converter of claim 1, wherein the controller continuously regulates an output voltage of the second switched-capacitor stage by varying the time durations that the inductor coupling current source is energized and de-energized through pulse width modulation.

3. The multi-stage DC-DC power converter of claim 1, wherein the inductor coupling current source comprises a single inductor.

4. The multi-stage DC-DC power converter of claim 3, wherein the inductor coupling current source comprises a plurality of inductors.

5. The multi-stage DC-DC power converter of claim 1, wherein the first and second switched-capacitor stages and the inductor coupling current sources are configured such that the inductor coupling current source conducts a fraction of a load current.

6. The multi-stage DC-DC power converter of claim 1, wherein the first and second switched-capacitor stages and the inductor coupling current source are configured and the controller operates such that an average current of the inductor coupling current source is reduced compared to a load current by a factor equal to a voltage conversion ratio of the second switched-capacitor stage.

7. The multi-stage DC-DC power converter of claim 1, comprising N additional switched-capacitor stages, wherein each coupling via switched-capacitor stages is an inductor coupling current source.

8. The multi-stage DC-DC power converter of claim 1, wherein coupling between the first and second switched-capacitor stages consists of the inductor coupling current source.

9. The multi-stage DC-DC power converter of claim 1, wherein one or both of the first and second switched-capacitor stages comprises a plurality of paralleled stages, each of which is coupled via an inductor coupling current source.

10. The multi-stage DC-DC power converter of claim 1, wherein the first and second switched-capacitor stages comprise series-parallel switched-capacitor stages and wherein the controller implements four different operating modes which provide four different voltage conversion ratios.

11. The multi-stage DC-DC power converter of claim 10, wherein the four different operation modes comprise lower-level series-parallel (LSP), lower-level parallel-series (LPS), upper-level parallel-series (UPS), and bypass parallel-series (BPS), and for each mode a duty cycle (D) times half of a switching period ($T_{SW}/2$) is defined as time spent energizing current in the inductor coupling current source.

12. The multi-stage DC-DC power converter of claim 11, wherein the controller is configured to control switches in the first and second switched-capacitor stages in a repetitive sequence of configurations such that:

a first configuration connects the first switched-capacitor stage to the input terminal and the inductor coupling current source while connecting the second switched-capacitor stage and the output terminal or the terminal of another inductor;

a second configuration disconnects the first switched-capacitor stage from the input terminal and connects the inductor coupling current source to ground while connecting the second switched-capacitor stage to the inductor coupling current source and the output terminal or the terminal of another inductor;

a third configuration that connects the first switched-capacitor stage between ground and the inductor coupling current source while connecting the second switched-capacitor stage to the inductor coupling current source and the output terminal or the terminal of another inductor;

a fourth configuration that disconnects the first switched-capacitor stage from the inductor coupling current source and connects the inductor coupling current source to ground while connecting the second switched-capacitor network to the inductor coupling current source and the output terminal or the terminal of the another inductor.

13. The multi-stage DC-DC power converter of claim 1, wherein the controller comprises a control loop consisting of an error amplifier, an output voltage sensor network, a regulation reference voltage, a pulse width modulator generator, and logic circuits, wherein the pulse width modulator generator consists of a triangle wave oscillator, a reference voltage generator, and a voltage comparator, wherein pulse width modulation power switch control signals are generated by comparing an output of the error amplifier to an output of the triangle wave oscillator.

14. The multi-stage DC-DC power converter of claim 13, wherein the voltage comparator comprises sufficient hysteresis to ensure stable detection behavior when its inputs are equal.

15. The multi-stage DC-DC power converter of claim 13, wherein the voltage comparator output controls a mode transition.

16. The multi-stage DC-DC power converter of claim 1, wherein the first switched-capacitor stage comprises a Dickson topology and the second switched-capacitor stage comprises a series-parallel topology.

* * * * *